(12) United States Patent
Fukuoka et al.

(10) Patent No.: US 9,997,122 B2
(45) Date of Patent: Jun. 12, 2018

(54) IMAGE DISPLAY DEVICE

(71) Applicant: Sharp Kabushiki Kaisha, Sakai, Osaka (JP)

(72) Inventors: Kenta Fukuoka, Sakai (JP); Tomoyuki Ishihara, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 48 days.

(21) Appl. No.: 15/123,264

(22) PCT Filed: Aug. 19, 2014

(86) PCT No.: PCT/JP2014/071614
§ 371 (c)(1),
(2) Date: Sep. 2, 2016

(87) PCT Pub. No.: WO2015/132983
PCT Pub. Date: Sep. 11, 2015

(65) Prior Publication Data
US 2017/0069281 A1  Mar. 9, 2017

(30) Foreign Application Priority Data

Mar. 6, 2014  (JP) .................................. 2014-043800

(51) Int. Cl.
*G09G 3/36* (2006.01)
*G02B 5/30* (2006.01)
(Continued)

(52) U.S. Cl.
CPC .............. *G09G 3/3648* (2013.01); *G02B 5/30* (2013.01); *G02B 26/04* (2013.01);
(Continued)

(58) Field of Classification Search
CPC ...... G02B 5/30; G02B 26/04; G02B 27/0101; G09G 3/3648; G09G 3/3426; G09G 3/346;
(Continued)

(56) References Cited

U.S. PATENT DOCUMENTS

2009/0059368 A1* 3/2009 Kamada .................. B32B 17/10
  359/489.01
2010/0225915 A1* 9/2010 Hong .................... G01N 21/648
  356/369

(Continued)

FOREIGN PATENT DOCUMENTS

JP  2010-091609 A  4/2010

*Primary Examiner* — Stephen G Sherman
(74) *Attorney, Agent, or Firm* — Keating & Bennett, LLP

(57) ABSTRACT

Provided is an image display device equipped with a see-through display function allowing the background to be seen through.
In a liquid crystal display device (100), a transparent plate (170) is attached such that the incidence angle of source light emitted by a backlight source (160) is Brewster's angle $\theta b$, and therefore, the transparent plate (170) reflects S-wave included in the source light, and allows P-wave included in ambient light incident from the back side to be transmitted therethrough and illuminate a liquid crystal panel (150). Thus, when the backlight source (160) is on, the viewer can see an image displayed on the background, whereas when the backlight source (160) is off, only the background can be seen.

9 Claims, 12 Drawing Sheets

(51) Int. Cl.
*G02B 27/01* (2006.01)
*G09G 3/34* (2006.01)
*G02B 26/04* (2006.01)
G03B 21/28 (2006.01)
G02F 1/1335 (2006.01)
G03B 21/62 (2014.01)

(52) U.S. Cl.
CPC ......... *G02B 27/0101* (2013.01); *G09G 3/346* (2013.01); *G09G 3/3426* (2013.01); *G02F 1/1336* (2013.01); *G02F 2001/133618* (2013.01); *G02F 2001/133627* (2013.01); *G03B 21/28* (2013.01); *G03B 21/62* (2013.01); *G09G 2300/023* (2013.01); *G09G 2300/0426* (2013.01); *G09G 2300/0465* (2013.01); *G09G 2310/0278* (2013.01); *G09G 2320/0646* (2013.01)

(58) Field of Classification Search
CPC ..... G09G 2300/023; G09G 2300/0426; G09G 2300/0465; G09G 2310/0278; G09G 2320/0646; G02F 1/1336; G02F 2001/133618; G02F 2001/133627; G03B 21/28; G03B 21/62
USPC .................................................. 345/96, 102
See application file for complete search history.

(56) References Cited

U.S. PATENT DOCUMENTS

| | | | |
|---|---|---|---|
| 2012/0140147 A1* | 6/2012 | Satoh | G03B 21/28 349/62 |
| 2014/0028981 A1* | 1/2014 | Matsubara | G03B 21/2073 353/20 |

* cited by examiner

IMAGE DISPLAY DEVICE

TECHNICAL FIELD

The present invention relates to image display devices, particularly to an image display device provided with a see-through display function allowing the background to be seen through.

BACKGROUND ART

Recent years have seen development of image display devices not only displaying images in accordance with externally inputted image data but also being equipped with a see-through display function allowing the background to be seen through. For example, Patent Document 1 discloses an image display device provided with a see-through display function, which, when displaying an image, renders the background opaque, thereby making the display image easier to see. FIG. 12 is a diagram illustrating the configuration of a liquid crystal display device 800 provided with a see-through display function, as disclosed in Patent Document 1. As shown in FIG. 12, the liquid crystal display device 800 includes a liquid crystal panel 810, a shutter film 820 provided on the back side of the liquid crystal panel 810, and a control portion 830 for controlling drive of the liquid crystal panel 810 and the shutter film 820. The shutter film 820 switches between two states; in one state, incident light on the liquid crystal panel 810 is directly transmitted therethrough, so that the area behind the shutter film 820 can be seen through, whereas in the other state, incident light on the liquid crystal panel 810 is indirectly transmitted therethrough, so that the area behind the shutter film 820 is shaded to an unidentifiable degree. Thus, the liquid crystal display device 800 renders the image displayed on the liquid crystal panel 810 easier to see or allows the area behind the liquid crystal panel 810 to be seen through.

PRIOR ART DOCUMENT

Patent Document

Patent Document 1: Japanese Patent Laid-Open Publication No. 2010-91609

SUMMARY OF THE INVENTION

Problems to be Solved by the Invention

The liquid crystal panel 810 is not a light-emitting panel, and therefore, it is necessary to dispose a backlight source behind the liquid crystal panel 810, and light up the backlight source to illuminate the liquid crystal panel 810 with backlight from the back side. In the case of the liquid crystal display device 800 described in Patent Document 1, to illuminate the liquid crystal panel 810 with backlight from the back side and also illuminate an exhibit (column) 850 placed behind the liquid crystal panel 810, the liquid crystal display device 800 is provided with a case 840 for accommodating the exhibit 850 and a light source (not shown) disposed inside the case 840. Accordingly, the inside of the case 840 is filled with strong light, so that not only the liquid crystal panel 810 but also the exhibit 850 are illuminated. However, the background of the liquid crystal display device 800 that can be seen through is limited to the inside of the case 840, and the background of the case 840 is not seen through.

Therefore, an objective of the present invention is to provide an image display device provided with a see-through display function allowing the background to be seen through.

Means for Solving the Problems

According to a first aspect of the present invention, there is provided an image display device having a see-through display function, including:

a polarization control pixel array configured to control a polarization direction of light on the basis of externally provided image information and thereby generate and emit a polarized wave including at least S-wave, P-wave, an S-wave component, or a P-wave component;

a display luminescent light source configured to irradiate the polarization control pixel array with source light; and light control means configured to allow P-wave or a P-wave component derived from ambient light to be transmitted and reflect S-wave or an S-wave component derived from source light, thereby emitting at least the P-wave, the P-wave component, the S-wave, or the S-wave component toward a front side of the image display device, or to block a part or all of the ambient light from being transmitted, the P-wave and the P-wave component being generated from ambient light incident from a back side of the image display device by controlling the polarization direction of the ambient light, the S-wave and S-wave component being derived from source light emitted by the display luminescent light source when the display luminescent light source is on, wherein, the light control means is attached such that the source light is incident at an angle approximately equal to Brewster's angle.

According to a second aspect of the present invention, in the first aspect of the invention, wherein, the polarization control pixel array is disposed so as to be irradiated from the back side with the P-wave or P-wave component derived from the ambient light and transmitted through the light control means and the S-wave included in the source light and reflected by the light control means, the light control means allows the P-wave or P-wave component derived from the ambient light to be transmitted and reflects the S-wave included in the source light when the display luminescent light source is on, thereby irradiating the polarization control pixel array from the back side with at least the P-wave or P-wave component derived from the ambient light or the S-wave included in the source light, or the light control means blocks a part or all of the ambient light from being transmitted, and the polarization control pixel array allows a first optional polarized wave, a second optional polarized wave, or both, to be transmitted, the first optional polarized wave being selected from first polarized waves generated on the basis of the P-wave or P-wave component derived from the ambient light and transmitted through the light control means, the second optional polarized wave having the same polarization direction as the first optional polarized wave and being selected from second polarized waves generated on the basis of the S-wave included in the source light and reflected by the light control means.

According to a third aspect of the present invention, in the second aspect of the invention, wherein, the polarization control pixel array includes a first liquid crystal panel and a first polarizing plate affixed to a front-side surface of the first liquid crystal panel, the first liquid crystal panel includes a plurality of pixel forming portions and generates the first polarized waves and the second polarized waves for each of the pixel forming portions by controlling rotation of the polarization direction for each of the P-wave or P-wave component derived from the ambient light and the S-wave included in the source light on the basis of the image information, and for each of the pixel forming portions, the first polarizing plate allows the first optional polarized wave selected from the first polarized waves generated by the first liquid crystal panel, the second optional polarized wave selected from the second polarized waves, or both, to be transmitted through to the front side of the image display device.

According to a fourth aspect of the present invention, in the first aspect of the invention, wherein, the polarization control pixel array is disposed close to the display luminescent light source and emits third polarized waves toward the light control means, the third polarized waves being generated by controlling the polarization direction of the source light emitted by the display luminescent light source, and the light control means allows the P-wave or P-wave component derived from the ambient light to be transmitted and reflects an S-wave or S-wave component selected from the third polarized waves derived from the source light when the display luminescent light source is on, thereby allowing the P-wave or P-wave component derived from the ambient light, the S-wave or S-wave component derived from the source light, or both, to reach the front side of the image display device, or the light control means blocks a part or all of the ambient light from being transmitted.

According to a fifth aspect of the present invention, in the fourth aspect of the invention, wherein, the polarization control pixel array includes a second liquid crystal panel and a second polarizing plate affixed to a surface of the second liquid crystal panel facing the display luminescent light source, the second polarizing plate transmits a polarized wave therethrough toward the second liquid crystal panel, the polarized wave being either P-wave or S-wave included in the source light emitted by the display luminescent light source, and the second liquid crystal panel includes a plurality of pixel forming portions, generates the third polarized waves for each of the pixel forming portions by controlling rotation of the polarization direction of the polarized wave on the basis of the image information, and emits the generated waves toward the light control means.

According to a sixth aspect of the present invention, in the fourth aspect of the invention, wherein a lens group consisting of a plurality of lenses is provided on the opposite side to the display luminescent light source with the polarization control pixel array positioned therebetween.

According to a seventh aspect of the present invention, in the first aspect of the invention, wherein the light control means includes a third liquid crystal panel and two third polarizing plates affixed to opposite sides of the third liquid crystal panel and transmitting P-wave therethrough, and the third liquid crystal panel generates fourth polarized waves by controlling rotation of the polarization direction of the ambient light incident from the back side of the image display device and allows P-wave or a P-wave component included in the fourth polarized waves to be selectively transmitted therethrough, or the third liquid crystal panel blocks a part or all of the ambient light from being transmitted.

According to an eighth aspect of the present invention, in the first aspect of the invention, wherein the light control means includes a transparent plate and a plurality of mechanical shutters capable of opening and closing and provided on a surface of the transparent plate, the mechanical shutters being opened/closed to allow the P-wave included in the ambient light to be transmitted or block a part or all of the ambient light from being transmitted.

According to a ninth aspect of the present invention, in the first aspect of the invention, further including a luminescent light source driver circuit configured to control power to be supplied to the display luminescent light source.

Effect of the Invention

In the first aspect of the present invention, source light emitted by the display luminescent light source illuminates the polarization control pixel array, and therefore, there is no need to provide a case for accommodating the image display device. Moreover, the image display device is capable of providing display in off-state where neither source light nor ambient light is transmitted therethrough, thereby allowing representation in black. Thus, the degree of freedom in display can be significantly increased. Furthermore, in on-state, only source light is transmitted so that only an image is displayed, whereas in transparent state, the display luminescent light source is turned off, and therefore, only ambient light is transmitted, so that only the background is displayed; further, display can be provided in a combined state of the two. In addition, by simply attaching the light control means such that the incidence angle of source light is Brewster's angle, it is rendered possible to display an image or the background in each of the states.

In the second aspect of the present invention, the light control means is disposed between the polarization control pixel array and the display luminescent light source, such that the polarization control pixel array is irradiated with the S-wave included in the source light and the P-wave or P-wave component derived from the ambient light. This renders it possible to achieve effects similar to those achieved by the first invention.

In the third aspect of the present invention, the polarization control pixel array includes the first liquid crystal panel and the first polarizing plate affixed to the front-side surface thereof. This allows the first liquid crystal panel to readily control rotation of the polarization direction for each of the source light and the ambient light on the basis of the image information, and also allows the first polarizing plate to readily select the first optional polarized wave from the first polarized waves and the second optional polarized wave from the second polarized waves.

The fourth aspect of the present invention renders it possible to achieve effects similar to those achieved by the first invention using an image display device which allows ambient light to be transmitted only through the light control means and functions as a see-through display with high transparency.

In the fifth aspect of the present invention, the polarization control pixel array includes the second liquid crystal panel and the second polarizing plate affixed to the surface of the second liquid crystal panel facing the display luminescent light source. This allows either P-wave or S-wave included in source light to be transmitted through the second polarizing plate and be incident on the second liquid crystal panel, making it possible to readily control rotation of the polarization direction of the second polarized waves on the basis of the image information.

In the sixth aspect of the present invention, the lens group is provided on the opposite side to the display luminescent light source with the polarization control pixel array positioned therebetween. The lens group renders it possible to project and display an image on the light control means, so that the image display device can be utilized as a projector.

In the seventh aspect of the present invention, the light control means selects and transmits the P-wave or P-wave component included in the fourth polarized waves generated by controlling rotation of the polarization direction of ambient light, or blocks a part or all of the ambient light from being transmitted, so that the image display device can provide display in any of the three states, i.e., on-state, transparent state, and off-state, or a combined state of the three.

In the eighth aspect of the present invention, the mechanical shutters are opened/closed to allow P-wave included in ambient light to be transmitted or block a part or all of the ambient light from being transmitted, so that the image display device can provide display in any of the three states, i.e., on-state, transparent state, and off-state, or a combined state of the three.

In the ninth aspect of the present invention, when displaying an image, if the luminance of the image is enhanced by increasing the intensity of source light, the background displayed along with the image becomes hard to see. Therefore, the amount of source light is increased by supplying power to the display luminescent light source, thereby enhancing the luminance of the image. Thus, the background displayed along with the image becomes hard to see, and the viewer sees substantially only the image, resulting in easy image viewing.

MODES FOR CARRYING OUT THE INVENTION

0. Basic Study

Reflection of light caused at the interface of two substances with different refractive indices (Fresnel reflection) will be described individually for S- and P-waves. It should be noted that where an incidence plane is a plane vertical to the interface and including incident light and reflected light, P-wave is linearly polarized light whose electric field oscillates in a direction parallel to the incidence plane, and S-wave is linearly polarized light whose electric field oscillates in a direction perpendicular to the incidence plane. That is, P- and S-waves are linearly polarized light waves whose electric fields oscillate in directions perpendicular to each other.

Figure 1:
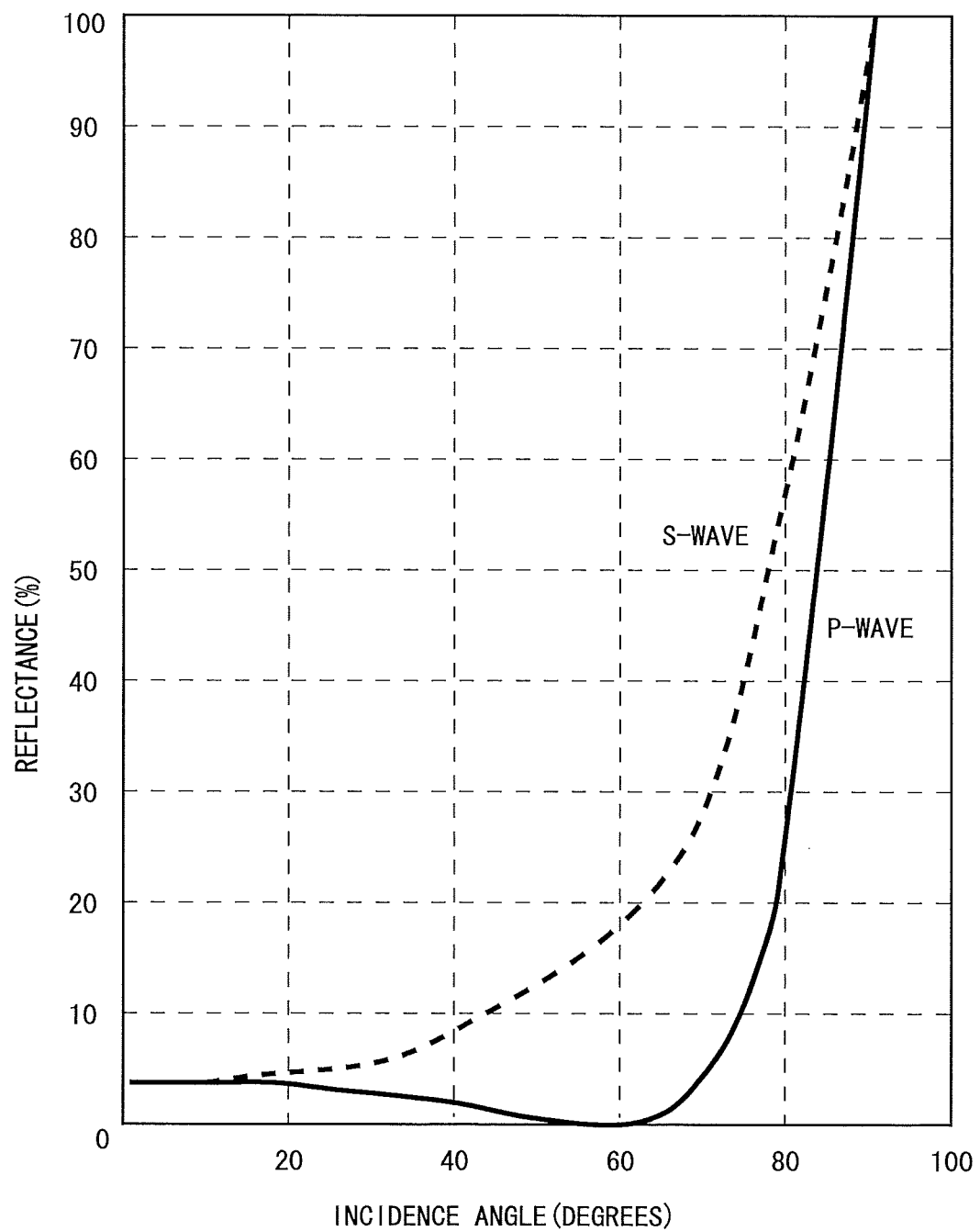
FIG. 1 is a graph showing the relationship between incidence angle and reflectance for each of P- and S-waves in the case of Fresnel reflection where light in the air is incident on a transparent plate made of a material with the refractive index n=1.49.

FIG. 1 is a graph showing the relationship between incidence angle and reflectance for each of P- and S-waves in the case of Fresnel reflection where light in the air is incident on a transparent plate made of a material with the refractive index n=1.49. As shown in FIG. 1, the reflectance of S-wave is approximately 3% where the incidence angle is 0°, and starts rising near 20° after being kept constant at approximately 3%. The incidence angle sharply increases particularly around 60°, and the reflectance is 100% where the incidence angle is 90°.

Similarly, as in the case of S-wave, the reflectance of P-wave is approximately 3% where the incidence angle is from 0° to near 20°. However, in contrast to the case of S-wave, the reflectance gradually decreases where the incidence angle is 20° or more, and the reflectance is approximately 0% near 60°. Moreover, as in the case of S-wave, when the incidence angle increases from near 60°, the reflectance increases sharply, and is 100% where the incidence angle is 90°. Note that the reflectance of S-wave is greater than the reflectance of P-wave over the entire range of incidence angles from 0° to 90°.

In this manner, unlike S-wave, the reflectance of P-wave is approximately 0% where the incidence angle is near 60°. More specifically, where the incidence angle is near 60°, P-wave is transmitted through the transparent plate without being reflected, so that P-wave transmittance is approximately 100%. Such an incidence angle is referred to as Brewster's angle, and when the incidence angle of P-wave is Brewster's angle, P-wave is transmitted through the transparent plate without being reflected. By taking advantage of this phenomenon, it is rendered possible to use the transparent plate as a polarizing plate to separate S-wave and P-wave and irradiate the liquid crystal panel only with S-wave.

1. First Embodiment

<1.1 Circuit Configuration of the Liquid Crystal Display Device>

Figure 2:
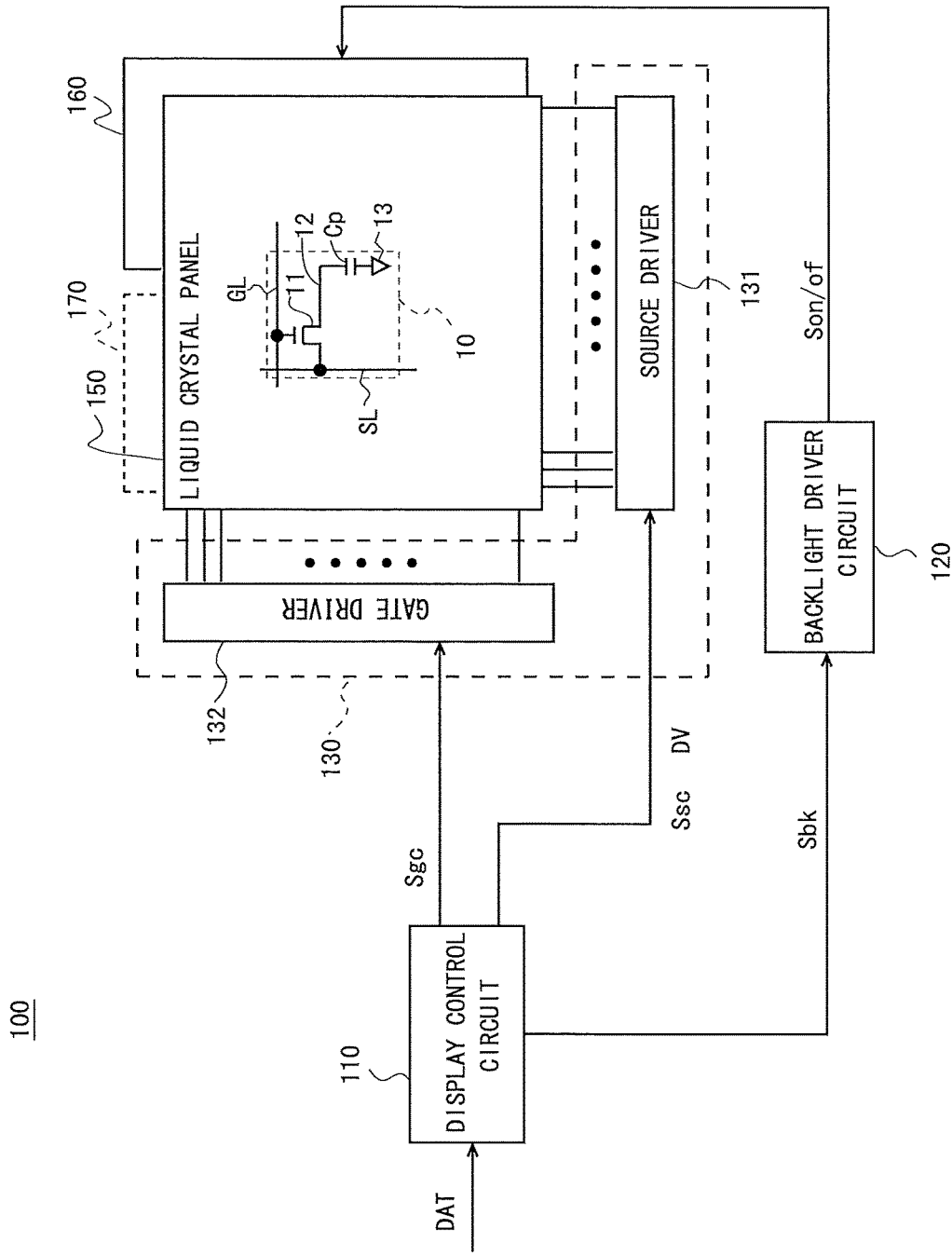
FIG. 2 is a block diagram illustrating the circuit configuration of a liquid crystal display device according to a first embodiment of the present invention.

FIG. 2 is a block diagram illustrating the circuit configuration of a liquid crystal display device 100 (also referred to as an "image display device") according to a first embodiment of the present invention. The liquid crystal display device 100 includes a display control circuit 110, a backlight driver circuit 120 (also referred to as a "luminescent light source driver circuit"), a drive portion 130, a liquid crystal panel 150 (also referred to as a "first liquid crystal panel") serving as a display portion, and a backlight source 160 (also referred to as a "display luminescent light source"). The drive portion 130 includes a source driver 131 serving as a data signal line driver circuit and a gate driver 132 serving as a scanning signal line driver circuit. In the liquid crystal display device 100, when the display control circuit 110 is externally provided with image data DAT (also referred to as "image information"), the display control circuit 110 internally generates control signals to control the source driver 131 and the gate driver 132, on the basis of the image data DAT. Note that these control signals may be externally provided along with the image data DAT.

The liquid crystal panel 150 has an absorptive polarizing plate (not shown) affixed to its surface. Moreover, the liquid crystal panel 150 includes a plurality of data signal lines SL, a plurality of scanning signal lines GL, and a plurality of pixel forming portions 10 disposed at intersections of the data signal lines SL and the scanning signal lines GL. For the sake of convenience, FIG. 2 shows only one data signal line SL, one scanning signal line GL, and one pixel forming portion 10 disposed at their intersection.

Each pixel forming portion 10 has a thin-film transistor (TFT) 11, which operates as a switching element and is connected at a gate terminal to its corresponding scanning signal line GL and at a source terminal to its corresponding data signal line SL, a pixel electrode 12 connected to a drain terminal of the TFT 11, a common electrode 13 commonly provided for the pixel forming portions 10, and a liquid crystal layer (not shown) commonly provided for the pixel forming portions 10 between the pixel electrode 12 and the common electrode 13. Moreover, the pixel electrode 12 and the common electrode 13 form liquid crystal capacitance, which acts as pixel capacitance Cp. Note that to reliably hold a voltage in the pixel capacitance Cp, auxiliary capacitance is typically provided parallel to the liquid crystal capacitance. Therefore, practically, the pixel capacitance Cp includes the liquid crystal capacitance and the auxiliary capacitance.

As the TFT 11, for example, a TFT with a channel layer made with an oxide semiconductor is used. More specifically, the channel layer of the TFT 11 is made with an oxide semiconductor including InGaZnO (indium gallium zinc oxide) composed of indium (In), gallium (Ga), zinc (Zn), and oxygen (O). The TFT 11 with the channel layer made with InGaZnO has a considerably lower off-leak current than silicon-based TFTs 11 with channel layers made with amorphous silicon or suchlike, and a voltage written in the pixel capacitance Cp of the pixel forming portion 10 can be held for a longer period of time. Furthermore, the TFT 11 can be reduced in size, so that the aperture ratio of the pixel forming portion 10 can be increased, and the transparency of the liquid crystal panel 150 can be enhanced. Note that the oxide semiconductor used as the channel layer of the TFT 11 is merely an illustrative example, and a semiconductor based on silicon, such as polysilicon or amorphous silicon, can also be used.

The backlight source 160 is disposed on the back side of the liquid crystal panel 150. The backlight source 160 is a light source with a plurality of LEDs (light-emitting diodes) arranged in a matrix or a plurality of CCFLs (cold-cathode fluorescent lamps) arranged in parallel, and such elements are lit up to irradiate the liquid crystal panel 150 with backlight (also referred to as "source light") from the back side. The on/off of the backlight source 160 is controlled by the backlight driver circuit 120, and the backlight driver circuit 120 turns on/off all LEDs or CCFLs included in the backlight source 160 simultaneously. Note that in the case of providing image display by local dimming in order to enhance image contrast, the backlight driver circuit 120 can turn on only some of the LEDs or CCFLs of the backlight source 160 on the basis of inputted image data DAT. In addition, as the backlight source 160, a light guide plate with a light source linearly attached at its end may be used. This allows light from the light source attached at the end to illuminate the liquid crystal panel 150 after being rendered planar and wide by the light guide plate.

When the liquid crystal panel 150 is externally provided with image data DAT representing an image to be displayed, on the basis of the image data DAT, the display control circuit 110 generates a source driver control signal Ssc to control the source driver 131, a gate driver control signal Sgc to control the gate driver 132, a backlight control signal Sbk to control the backlight driver circuit 120, and digital image data DV. The source driver control signal Ssc and the digital image data DV are provided to the source driver 131, the gate driver control signal Sgc is provided to the gate driver 132, and the backlight control signal Sbk is provided to the backlight driver circuit 120. As a result, the source driver 131, the gate driver 132, and the backlight driver circuit 120 are driven in synchronization.

On the basis of the digital image data DV, which represents the image to be displayed, and the source driver control signal Ssc, the source driver 131 generates and outputs data signals to be provided to the data signal lines SL. The source driver control signal Ssc includes, for example, a source start pulse signal, a source clock signal, a latch strobe signal, and a polarity switching control signal. In accordance with the source driver control signal Ssc, the source driver 131 operates unillustrated internal elements, such as a shift register and a sampling latch circuit, and an unillustrated D/A conversion circuit converts digital image signals, which are obtained on the basis of the digital image data DV, to analog signals, thereby generating the data signals.

On the basis of the gate driver control signal Sgc, the gate driver 132 applies active scanning signals sequentially to the scanning signal lines GL in predetermined cycles. The gate driver control signal Sgc includes, for example, a gate clock signal and a gate start pulse signal. In accordance with the gate clock signal and the gate start pulse signal, the gate driver 132 operates unillustrated internal elements such as a shift register, thereby generating the scanning signals. Note that FIG. 2 also illustrates a transparent plate 170 to be described later.

<1.2 Configuration and Operation of the Liquid Crystal Display Device>

Figure 3:
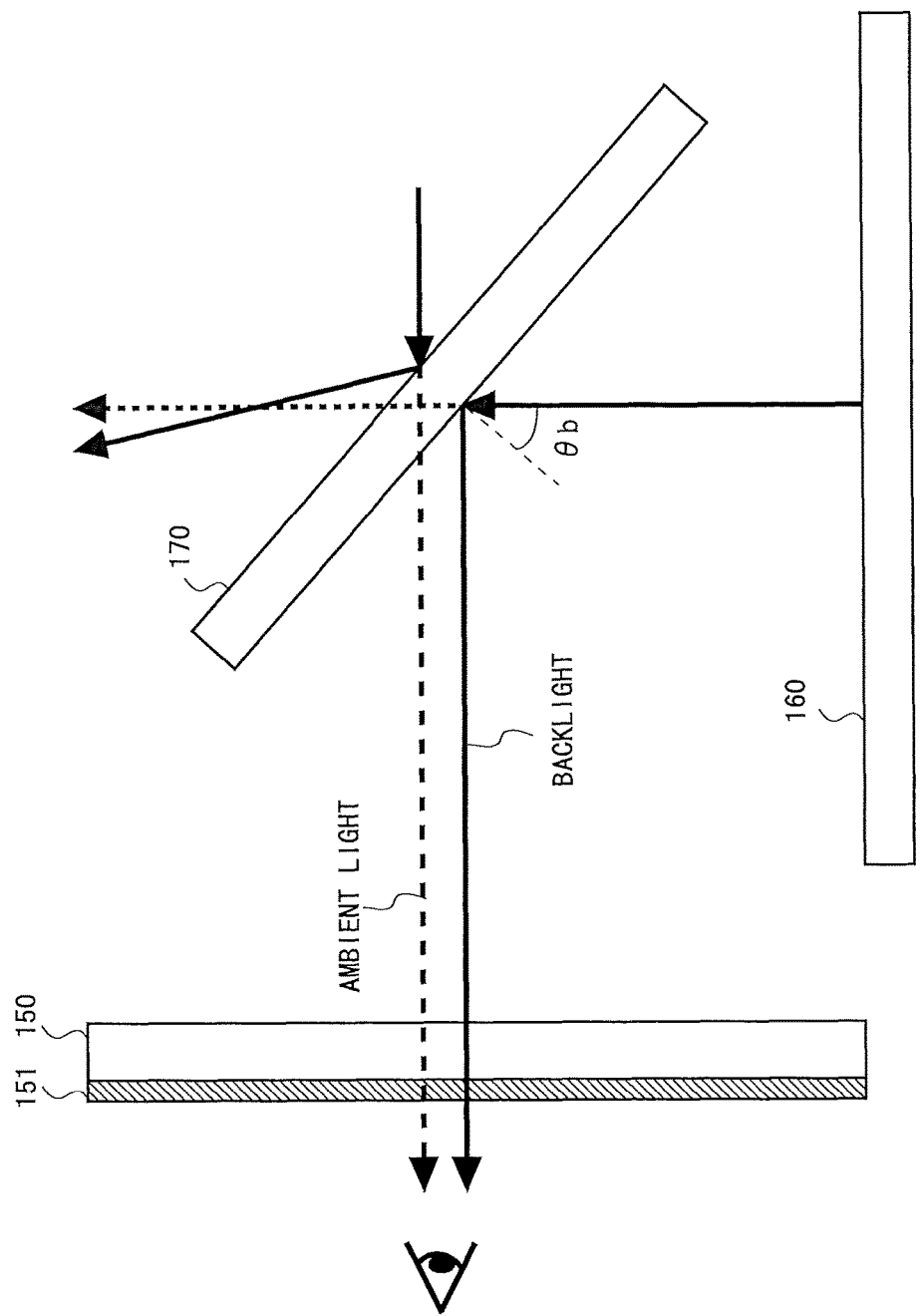
FIG. 3 is a diagram illustrating the configuration of the liquid crystal display device according to the first embodiment of the present invention.

FIG. 3 is a diagram illustrating the configuration of the liquid crystal display device 100 according to the present embodiment. As shown in FIG. 3, the liquid crystal display device 100 includes the backlight source 160, the transparent plate 170 (also referred to as the "light control means"), the liquid crystal panel 150, and an absorptive polarizing plate 151 (also referred to as a "first polarizing plate"). The absorptive polarizing plate 151 is a polarizing plate which absorbs S-wave and transmits P-wave therethrough, and is affixed to the front (viewer-side) surface of the liquid crystal panel 150. Note that the absorptive polarizing plate 151 may be a polarizing plate which absorbs P-wave and transmits S-wave therethrough.

The transparent plate 170 is attached such that the incidence angle of backlight emitted by the backlight source 160 is Brewster's angle θb. For example, a description will be given by taking as an example the case where the backlight emitted by the backlight source 160 is incident on the transparent plate 170 made of a material with the refractive index n=1.49. As shown in FIG. 1, about 17% of S-wave included in the incident light is reflected by the surface of the transparent plate 170, so that about 83% of S-wave and P-wave enter the transparent plate 170. When the light having entered the transparent plate 170 exits the transparent plate 170, about 17% of S-wave is reflected, so that about 66% of S-wave and P-wave are transmitted through the transparent plate 170 toward the back side of the liquid crystal display device 100. The S-wave reflected by the transparent plate 170 (about 34% of S-wave included in the incident light) is incident on the liquid crystal panel 150 from the back side.

It is difficult to accurately attach the transparent plate 170 such that the incidence angle is Brewster's angle θb, and therefore, the backlight reflected by the transparent plate 170 includes not only S-wave but also P-wave. The P-wave and the S-wave that are to be transmitted through the transparent plate 170 experience refraction upon incident on and emission from the transparent plate 170, but such refraction does not directly affect the essence of the present invention. Accordingly, FIG. 3 and other figures to be described later depict P-wave and S-wave incident on the transparent plate 170 as traveling straight without being refracted. Moreover, the transparent plate 170 is, for example, a substrate made of a transparent material, such as glass, PMMA (poly(methyl methacrylate)), PC (polycarbonate), and PS (polystyrene).

Furthermore, light that represents the background of the liquid crystal display device 100 (referred to below as "ambient light") is also incident on the transparent plate 170 from the back side. Among the ambient light incident on the transparent plate 170, S-wave is partially reflected by the transparent plate 170, and P-wave and unreflected S-wave are transmitted through the transparent plate 170. Accordingly, the ambient light transmitted through the transparent plate 170 includes more P-wave than S-wave. The ambient light transmitted through the transparent plate 170 is also incident on the liquid crystal panel 150 from the back side. In this manner, the backlight reflected by the transparent plate 170 and including more S-wave, and the ambient light transmitted through the transparent plate 170 and including more P-wave are simultaneously incident on the liquid crystal panel 150 from the back side.

The pixel forming portions 10 of the liquid crystal panel 150 have applied thereto the respective data signals generated by the source driver 131 on the basis of the image data DAT. When S-wave of the backlight is incident on the pixel forming portions 10, the polarization direction of the S-wave is rotated in accordance with the data signal for each pixel forming portion 10. As a result, the pixel forming portions 10 of the liquid crystal panel 150 emit the S-wave without a change, or emit P-wave converted from the S-wave, or light converted from the S-wave and including S-wave and P-wave components. The absorptive polarizing plate 151 affixed to the surface of the liquid crystal panel 150 is a polarizing plate which transmits P-wave or a P-wave component therethrough or absorbs S-wave or an S-wave component, and therefore, only the P-wave or P-wave component derived from the backlight transmitted through the liquid crystal panel 150 reaches the front side of the liquid crystal display device 100. In this case, the backlight reflected by the transparent plate 170 also includes P-wave. Among the light generated by the liquid crystal panel 150 on the basis of the P-wave, only the P-wave or P-wave component is transmitted through the absorptive polarizing plate 151 to the front side of the liquid crystal display device 100. Note that herein, S-wave included in backlight and emitted by the liquid crystal panel 150 after the polarization direction is rotated in accordance with the data signal applied to the liquid crystal panel 150, P-wave converted from S-wave, and light converted from S-wave and including S-wave and P-wave components will also be collectively referred to as "second polarized waves". In addition, among the "second polarized waves", the P-wave or P-wave component transmitted through the absorptive polarizing plate 151 will also be referred to as the "second optional polarized wave". In the case where a polarizing plate which transmits S-wave therethrough is used in place of the absorptive polarizing plate 151, the S-wave or S-wave component will be referred to as the "second optional polarized wave".

As for P-wave included in ambient light also, the polarization direction is rotated in accordance with the data signal applied to the pixel forming portion 10 of the liquid crystal panel 150. Once P-wave of ambient light is incident on the pixel forming portions 10, the polarization direction of the P-wave is rotated in accordance with the data signal for each pixel forming portion 10. As a result, the liquid crystal panel 150 emits the P-wave without a change, or emits S-wave converted from the P-wave, or light converted from the P-wave and including P-wave and S-wave components. The S-wave or S-wave component emitted by the liquid crystal panel 150 is absorbed by the absorptive polarizing plate 151, whereas the P-wave or P-wave component is transmitted through the absorptive polarizing plate 151 to the front side of the liquid crystal display device 100. In this case, the ambient light transmitted through the transparent plate 170 also includes S-wave. Among the light generated by the liquid crystal panel 150 on the basis of the S-wave, only the P-wave or P-wave component is transmitted through the absorptive polarizing plate 151 to the front side of the liquid crystal display device 100. Note that herein, P-wave included in ambient light and emitted by the liquid crystal panel 150 after the polarization direction is rotated in accordance with the data signal applied to the liquid crystal panel 150, S-wave converted from P-wave, and light converted from P-wave and including P-wave and S-wave components will also be collectively referred to as "first polarized waves". In addition, among the "first polarized waves", the P-wave or P-wave component transmitted through the absorptive polarizing plate 151 will also be referred to as the "first optional polarized wave". In the case where a polarizing plate which transmits S-wave therethrough is used in place of the absorptive polarizing plate 151, the S-wave or S-wave component will be referred to as the "second optional polarized wave".

As a result, the liquid crystal display device 100 displays an image in accordance with the image data DAT by means of the P-wave or P-wave component derived from the backlight transmitted through the pixel forming portions 10, and the liquid crystal panel 150 is rendered transparent by means of the P-wave or P-wave component derived from the ambient light transmitted through the same pixel forming portions 10, so that the background of the liquid crystal display device 100 can be seen through. The backlight and the ambient light are transmitted through the same pixel forming portions 10, and therefore, the image is displayed on the background.

In the liquid crystal display device 100, the rate of the S-wave incident on the liquid crystal panel 150 is as low as about 34% of the S-wave included in the backlight, as described above. Therefore, to increase the amount of backlight, the backlight driver circuit 120 is controlled to increase the power to be supplied to the backlight source 160. As a result, the luminance of the image to be displayed on the liquid crystal panel 150 can be increased. Thus, the viewer can see substantially only the image, and is less likely to recognize the background displayed along with the image.

Furthermore, when the backlight source 160 is turned off by controlling the backlight driver circuit 120, the P-wave of the ambient light transmitted through the transparent plate 170 illuminates the liquid crystal panel 150 from the back side. Each pixel forming portion 10 of the liquid crystal panel 150 rotates the polarization direction of the P-wave in accordance with a voltage value of the data signal applied, and emits P-wave, S-wave, or light including P-wave and S-wave components. The S-wave or S-wave component derived from the ambient light and emitted by the liquid crystal panel 150 is absorbed by the absorptive polarizing plate 151, and only the P-wave or P-wave component is transmitted through the absorptive polarizing plate 151 to the front side of the liquid crystal display device 100.

In this case, the ambient light transmitted through the transparent plate 170 also includes the S-wave that was not reflected by the transparent plate 170. Among the light generated by the liquid crystal panel 150 on the basis of such S-wave, only the P-wave or P-wave component is transmitted through the absorptive polarizing plate 151 to the front side of the liquid crystal display device 100. In this manner, when the backlight source 160 is turned off, the P-wave or P-wave component derived from the ambient light is transmitted through to the front side of the liquid crystal display device 100. As such, when the backlight source 160 is turned off, the liquid crystal display device 100 functions as a see-through display, and the pixel forming portions 10 are rendered transparent, so that only the background is displayed. Thus, the viewer can see the background of the liquid crystal display device 100.

Even when the backlight source 160 is on, P-wave derived from ambient light incident on the liquid crystal panel 150 and S-wave derived from backlight are transmitted without rotating the polarization directions, the S-wave derived from the backlight is absorbed by the absorptive polarizing plate 151, and the P-wave derived from the ambient light is transmitted through to the front side of the liquid crystal display device 100. In this manner, in the case where P-wave included in reflected backlight can be ignored, the light transmitted through the liquid crystal panel 150 is only the P-wave derived from the ambient light, and the pixel forming portions 10 are rendered substantially transparent, so that only the background is displayed.

Furthermore, in the case where a polarizing plate which absorbs S-wave and transmits P-wave therethrough is used as the absorptive polarizing plate 151, even when the liquid crystal display device 100, including the backlight source 160, is powered off, P-wave included in ambient light transmitted through the transparent plate 170 is transmitted through the liquid crystal panel and the absorptive polarizing plate 151 to the front side of the liquid crystal display device 100 without a change of the polarization direction. Thus, even when the liquid crystal display device 100 is powered off, the viewer can see the background of the liquid crystal display device 100 through the liquid crystal panel 150.

<1.3 Effects>

The present embodiment eliminates the need to provide a case for accommodating the liquid crystal display device 100, and therefore, renders it possible for the viewer to see the background of the liquid crystal display device 100 through the liquid crystal display device 100 without the view being limited to the inside of a case.

Furthermore, the liquid crystal display device 100 allows an image based on image data DAT to be displayed on the background by turning on the backlight source 160, or renders the liquid crystal panel 150 transparent and thereby displays only the background by turning off the backlight source 160. In this manner, the liquid crystal display device 100 renders it possible to provide display either in the state where an image is displayed on the background (on-state) or in the state where only the background is displayed (transparent state).

Furthermore, in the case where an image is displayed, the luminance of the image is increased by raising the intensity of backlight, so that the background that is displayed along with the image is less likely to be recognized, thereby rendering the image easier to see for the viewer.

Furthermore, the liquid crystal display device 100 functions as a highly transparent see-through display simply by attaching the transparent plate 170 between the liquid crystal panel 150 and the backlight source 160, such that the incidence angle of backlight is Brewster's angle θb. Thus, it is possible to manufacture the liquid crystal display device 100 with the function of a highly transparent see-through display at low cost.

<1.4 Variants>

<1.4.1 First Variant>

Instead of affixing the absorptive polarizing plate 151 to the front-side surface of the liquid crystal panel 150, a reflective polarizing plate which reflects S-wave and transmits P-wave therethrough may be affixed. In this case also, the liquid crystal display device 100 is capable of providing display in either of the two states, on-state or transparent state. Note that the reflective polarizing plate reflects not only S-wave emitted by the liquid crystal panel 150 but also S-wave incident from the front side of the liquid crystal display device 100. Accordingly, in the case where the reflective polarizing plate is affixed to the front side of the liquid crystal panel 150, the viewer sees an image in accordance with image data DAT in a half mirror reflecting a front-side view. Note that in place of the reflective polarizing plate, a polarizing plate which reflects P-wave and transmits S-wave therethrough may be affixed to the surface of the liquid crystal panel 150. Herein, the absorptive polarizing plate and the reflective polarizing plate will also be collectively referred to as the "polarizing plates".

<1.4.2 Second Variant>

Figure 4:
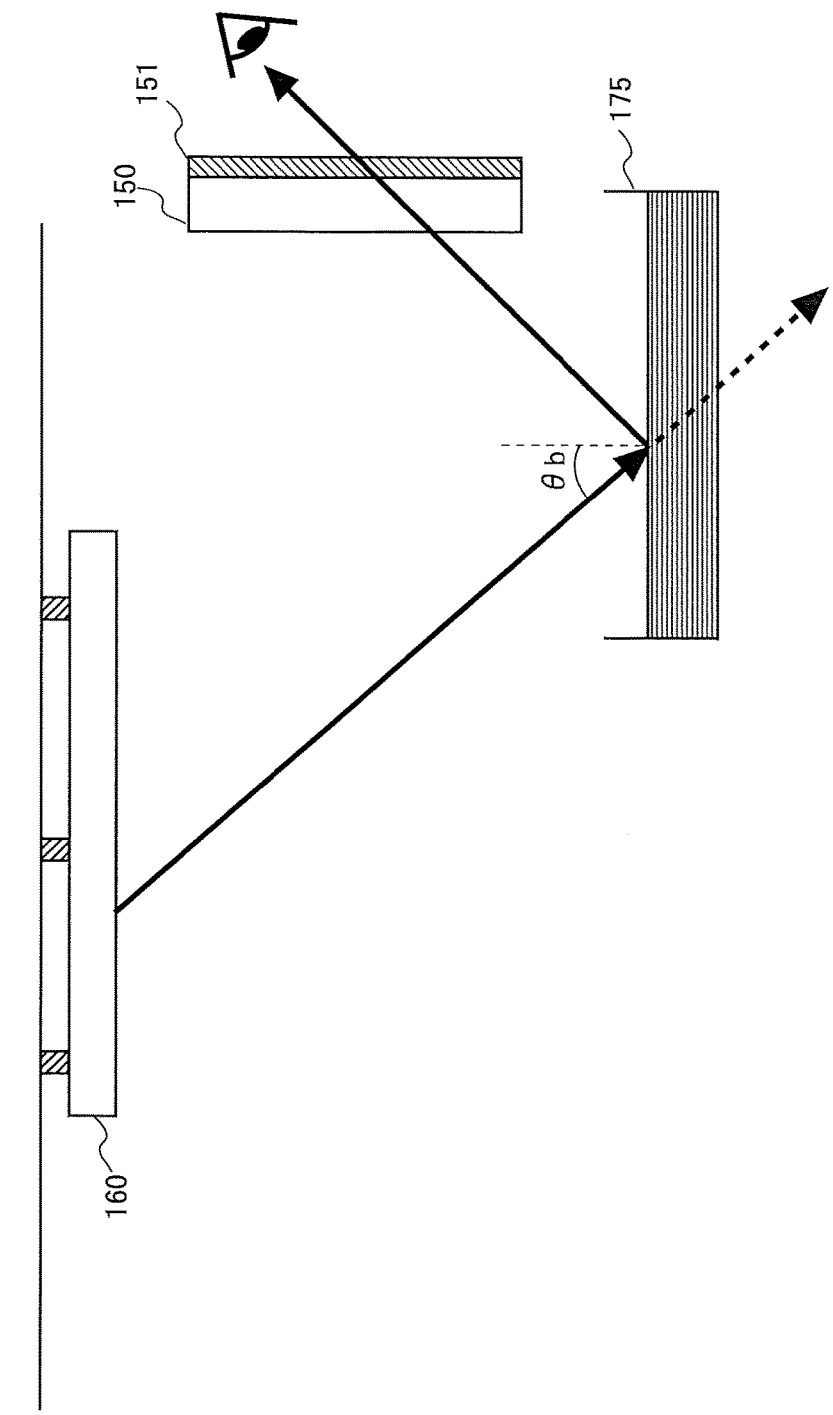
FIG. 4 is a diagram illustrating the configuration of a liquid crystal display device using a container filled with a liquid, in place of the transparent plate of the liquid crystal display device shown in FIG. 3.

Furthermore, in place of the transparent plate 170, a container 175 (also referred to as "light control means") filled with a liquid such as water can be used. FIG. 4 is a diagram illustrating the configuration of a liquid crystal display device 100A (also referred to as an "image display device") using the container 175 filled with a liquid, in place of the transparent plate 170. As shown in FIG. 4, the backlight source 160 is attached to the ceiling of a room, and the container 175 filled with a liquid is placed diagonally below the backlight source 160, such that the incidence angle of backlight is Brewster's angle θb. By placing the container 175 filled with a liquid in such a manner, S-wave included in backlight emitted by the backlight source 160 is reflected at the surface of the liquid, and is incident on the liquid crystal panel 150 from the back side. Thus, the liquid crystal display device 100A is capable of displaying an image based on image data DAT.

2. Second Embodiment

The circuit configuration of a liquid crystal display device 200 (also referred to as an "image display device") according to a second embodiment of the present invention is the same as that of the liquid crystal display device 100 shown in FIG. 2, and therefore, any description and block diagram thereof will be omitted.

<2.1 Configuration and Operation of the Liquid Crystal Display Device>

Figure 5:
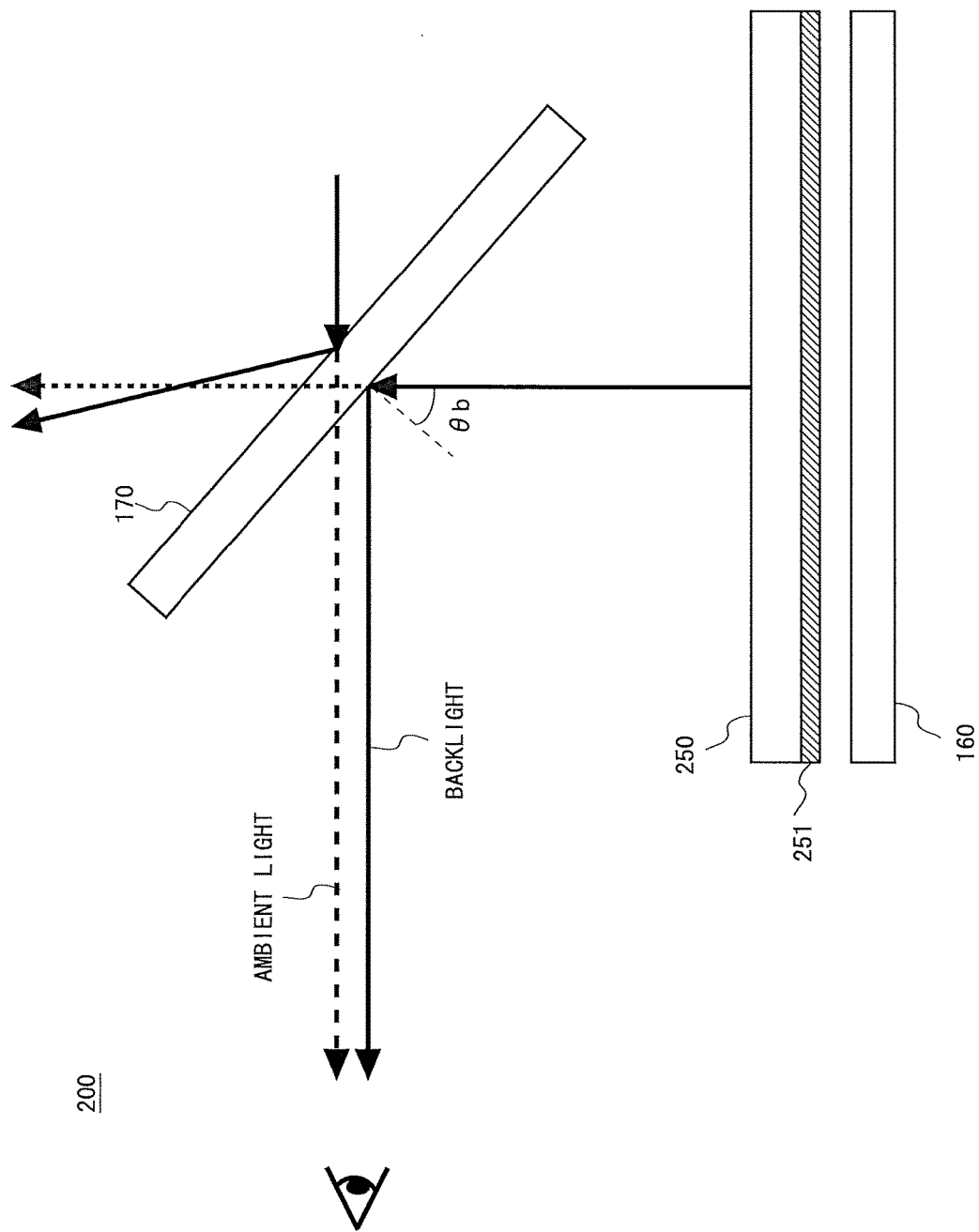
FIG. 5 is a diagram illustrating the configuration of a liquid crystal display device according to a second embodiment of the present invention.

FIG. 5 is a diagram illustrating the configuration of the liquid crystal display device 200 according to the present embodiment. In the liquid crystal display device 200, the backlight source 160 and the transparent plate 170 are arranged in the same manner as in the liquid crystal display device 100 shown in FIG. 2. However, a liquid crystal panel 250 (also referred to as a "second liquid crystal panel") is disposed close to the backlight source 160, rather than at the front of the liquid crystal display device 200, and has an absorptive polarizing plate 251 (also referred to as a "second polarizing plate") affixed to the surface that faces the backlight source 160. The absorptive polarizing plate 251 of the present embodiment is also a polarizing plate which absorbs S-wave and transmits P-wave therethrough, but may be a polarizing plate which absorbs P-wave and transmits S-wave therethrough.

In the liquid crystal display device 200 as above, S-wave and P-wave emitted by the backlight source 160 are incident on the absorptive polarizing plate 251. Since the absorptive polarizing plate 251 absorbs S-wave and transmits P-wave therethrough, only the P-wave is incident on the liquid crystal panel 250. A data signal in accordance with image data DAT is being applied to each pixel forming portion 10 of the liquid crystal panel 250, and therefore, the polarization direction of the P-wave incident on the liquid crystal panel 250 is rotated in accordance with the data signal. As a result, the liquid crystal panel 250 emits the P-wave without a change, or emits S-wave converted from the P-wave or light converted from the P-wave and including S-wave and P-wave components. In this state, only the polarization direction is rotated, and therefore, even if the viewer can see the liquid crystal panel 250 from above, the viewer only sees the entire liquid crystal panel 250 shining uniformly, and cannot see any image. The transparent plate 170 is attached such that the incidence angle of backlight emitted by the liquid crystal panel 250 is Brewster's angle θb. Accordingly, S-wave or an S-wave component included in backlight emitted by the liquid crystal panel 250 is partially reflected by the surface of the transparent plate 170 and reaches the front side of the liquid crystal display device 200. Moreover, among the backlight, P-wave or a P-wave component and unreflected S-wave or S-wave component are transmitted through the transparent plate 170 toward the back side of the liquid crystal display device 200. Accordingly, the viewer on the front side of the liquid crystal display device 200 can see an image in accordance with the image data DAT. Note that herein, S-wave included in backlight and emitted by the liquid crystal panel 250 after the polarization direction is rotated in accordance with the data signal applied to the liquid crystal panel 250, P-wave converted from S-wave, and light converted from S-wave and including P-wave and S-wave components will also be collectively referred to as "third polarized waves".

Furthermore, in the case where ambient light is incident on the transparent plate 170 from the back side of the liquid crystal display device 200, S-wave included in the ambient light is partially reflected by the transparent plate 170 toward the back side of the liquid crystal display device 200, whereas P-wave and unreflected S-wave are transmitted through the transparent plate 170 and are incident on the liquid crystal panel 250. P-wave generated by the polarization direction being rotated by the liquid crystal panel 250 is transmitted through the absorptive polarizing plate to the front side of the liquid crystal display device 200. Accordingly, because of the P-wave derived from the ambient light transmitted through the transparent plate 170, the viewer on the front side of the liquid crystal display device 200 can see the background of the liquid crystal display device 200.

In this manner, when the backlight source 160 is on, the viewer sees an image displayed on the background, whereas when the backlight source 160 is off, the image becomes transparent so that only the background can be seen. That is, as in the case of the liquid crystal display device 100, the liquid crystal display device 200 is capable of providing display either in two states, on-state or transparent state. Note that as in the case of the liquid crystal display device 100, even when the backlight source 160 is on, the pixel forming portions 10 can be rendered substantially transparent, so that only the background can be displayed.

Furthermore, in the case where a polarizing plate which absorbs S-wave and transmits P-wave therethrough is used as the absorptive polarizing plate 251, even when the liquid crystal display device 200, including the backlight source 160, is powered off, the viewer can see the background of the liquid crystal display device 200 through the transparent plate 170, as in the case of the liquid crystal display device 100.

In the liquid crystal display device 200, the pixel forming portions 10 of the liquid crystal panel 250 can be controlled such that all pixel forming portions 10 are set in the same state, either on-state or transparent state, or in different states independently of one another.

Typically, the liquid crystal panel has color filters affixed thereto for the purpose of displaying a color image. Such a color filter has a high optical absorption coefficient, and the aperture ratio of the liquid crystal panel is difficult to increase since the liquid crystal panel has TFTs, data signal lines, scanning signal lines, etc., provided thereon. Therefore, in the liquid crystal display device 100 according to the first embodiment, incident light is transmitted through the liquid crystal panel 150 with color films affixed thereto and wiring lines provided thereon. Accordingly, if the liquid crystal display device 100 is driven in color filter mode, transmittance for incident light decreases. On the other hand, in the liquid crystal display device 200, ambient light is transmitted only through the transparent plate 170 until the ambient light reaches the front side after incidence from the back side, so that transmittance for ambient light becomes extremely high. Therefore, the liquid crystal display device 200 is used as a see-through display with extremely high transparency, so that the viewer can easily see the background of the liquid crystal display device 200. Note that if the liquid crystal display device 100 is driven in field-sequential mode, the viewer can directly view the liquid crystal panel 150 with an image being displayed, and therefore, can see the image more easily.

The absorptive polarizing plate 251 has been described above as being affixed to the surface of the liquid crystal panel 250 that faces the backlight source 160. However, in place of the absorptive polarizing plate 251, a reflective polarizing plate which reflects S-wave and transmits P-wave therethrough may be affixed. In such a case, only P-wave is transmitted through the reflective polarizing plate and is incident on the liquid crystal panel 250. The operation of the liquid crystal display device 200 thereafter is the same as in the case where the absorptive polarizing plate 251 is affixed, and therefore, any description thereof will be omitted. Moreover, in place of the reflective polarizing plate which reflects S-wave and transmits P-wave therethrough, a polarizing plate which reflects P-wave and transmits S-wave therethrough may be affixed to the liquid crystal panel 250. Further, in the case of the liquid crystal display device 200, local dimming can be performed by turning on some of the LEDs or suchlike included in the backlight source 160.

<2.2 Effects>

The present embodiment renders it possible to achieve effects similar to those achieved by the first embodiment. Accordingly, the liquid crystal display device 200 can provide display in either of the two states, on-state or transparent state.

Furthermore, in the present embodiment, ambient light is transmitted only through the transparent plate 170 and reaches the front side of the liquid crystal display device 200, resulting in high transmittance for ambient light. Thus, the liquid crystal display device 200 is utilized as a see-through display with extremely high transparency, so that the viewer can see the background more easily, and each pixel forming portion 10 allows such easy viewing of the background.

Furthermore, to realize high transparency for a see-through display, typically, it is necessary to perform drive in field-sequential mode using a liquid crystal panel with no color filter affixed thereto. However, in the case of the liquid crystal display device 200, only the transparent plate 170 affects transparency determined by transmittance for ambient light, and further, the transparent plate 170 has neither color filters affixed thereto nor wiring lines formed thereon. Accordingly, to achieve high transparency, the liquid crystal display device 200 is not required to be driven in field-sequential mode, and is simply driven in color filter mode. Thus, even when a typical liquid crystal panel is used as the liquid crystal panel 250, the liquid crystal display device 200 functions as a see-through display with extremely high transparency.

<2.3 Variants>
<2.3.1 First Variant>

Figure 6:
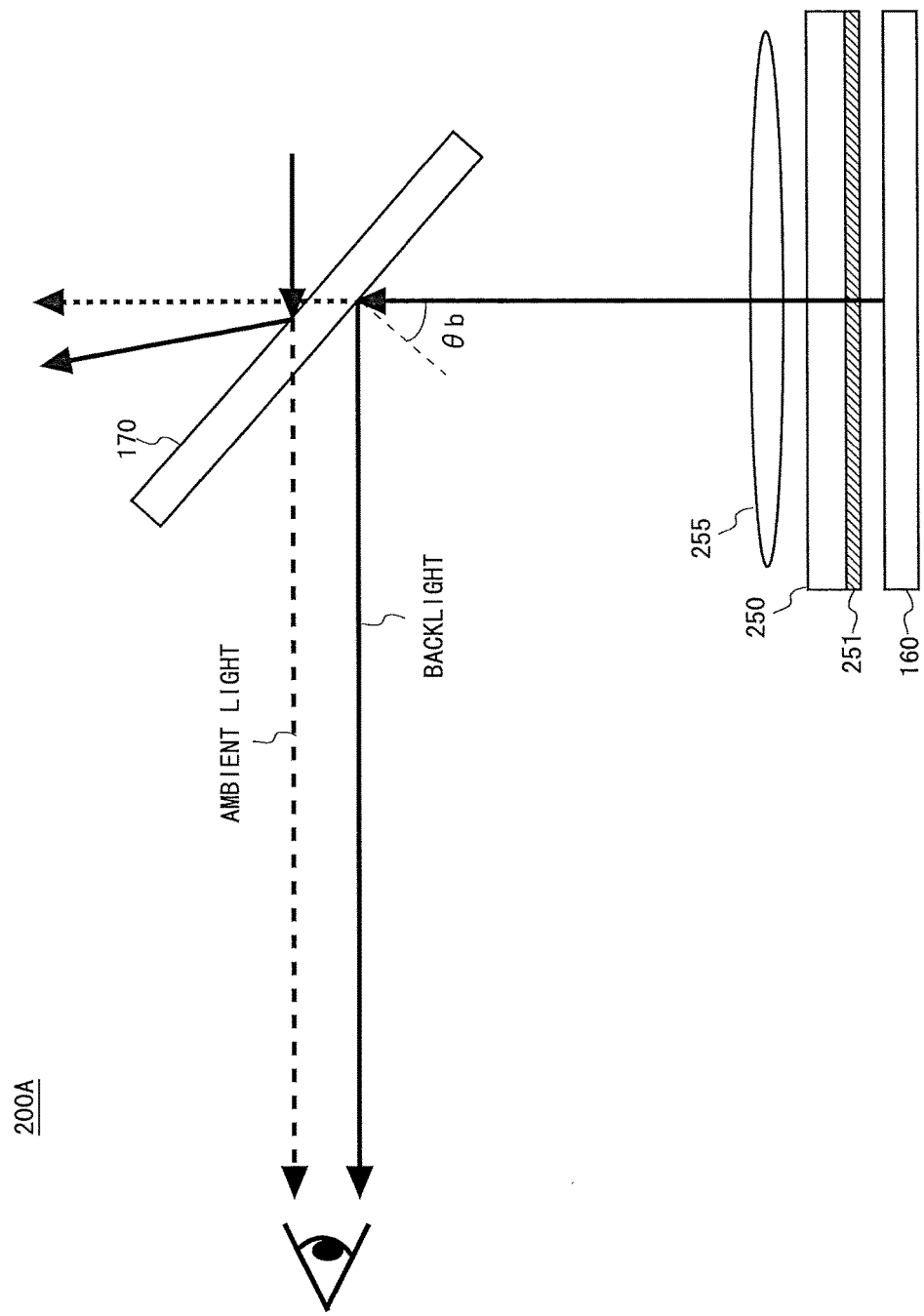
FIG. 6 is a diagram illustrating the configuration of an image display device according to a first variant of the second embodiment of the present invention, which functions as a projector.

FIG. 6 is a diagram illustrating the configuration of a liquid crystal display device 200A (also referred to as an "image display device") according to a first variant of the present embodiment, which is utilized as a projector. As shown in FIG. 6, the backlight source 160 is provided on one side of the liquid crystal panel 250, and there is a lens group 255, which includes a combination of lenses, provided on the other side. The liquid crystal display device 200A projects an image onto the transparent plate 170 by means of the lens group 255. The viewer looks at the transparent plate 170, thereby seeing the projected image and/or the background. Note that in FIG. 6, for the sake of convenience, the lens group 255 is depicted as a convex lens. Moreover, as with the liquid crystal display device 200, the liquid crystal display device 200A allows local dimming.

<2.3.2 Second Variant>

Figure 7:
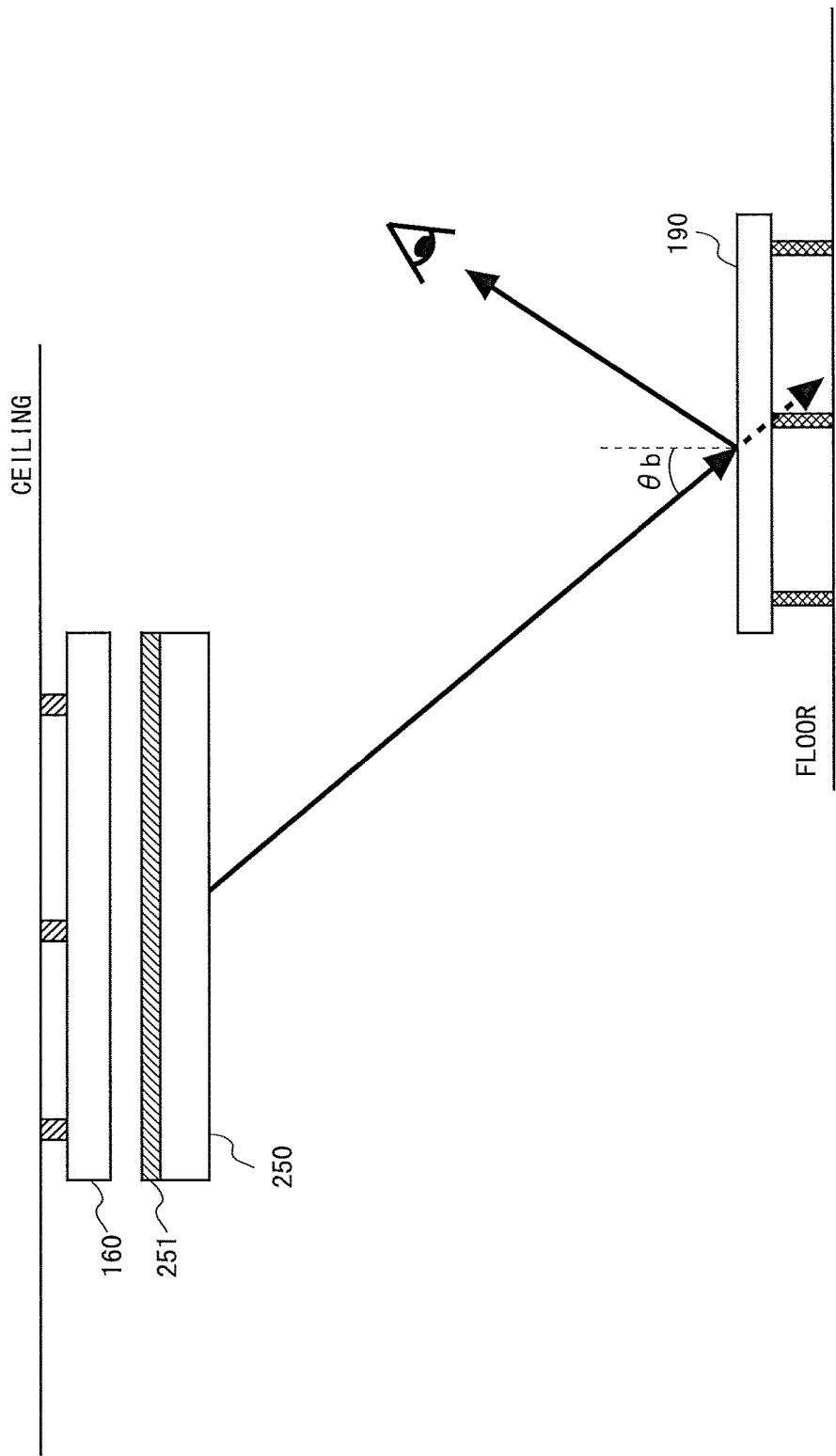
FIG. 7 is a diagram illustrating the configuration of a liquid crystal display device according to a second variant of the second embodiment of the present invention.

FIG. 7 is a diagram illustrating the configuration of a liquid crystal display device 200B (also referred to as an "image display device") according to a second variant of the present embodiment. As shown in FIG. 7, the backlight source 160 is attached to the ceiling of a room, and further, the liquid crystal panel 250 is attached to the backlight source 160. The surface of the liquid crystal panel 250 that faces the backlight source 160 has the absorptive polarizing plate 251 affixed thereto. On the floor diagonally below the backlight source 160 is placed a table with a top 190 made of glass (also referred to as a "glass board"). The position where the tabletop 190 is placed is such that the incidence angle of backlight emitted by the backlight source 160 is equal to Brewster's angle θb. In this case, the tabletop 190 reflects S-wave included in the backlight as a transparent plate, and therefore, the viewer in the travel direction of the reflected S-wave can see an image in accordance with image data DAT. Note that in place of the absorptive polarizing plate 251, a reflective polarizing plate may be affixed to the surface of the liquid crystal panel 250. Moreover, as with the liquid crystal display device 200, the liquid crystal display device 200B allows local dimming.

3. Third Embodiment

Figure 8:
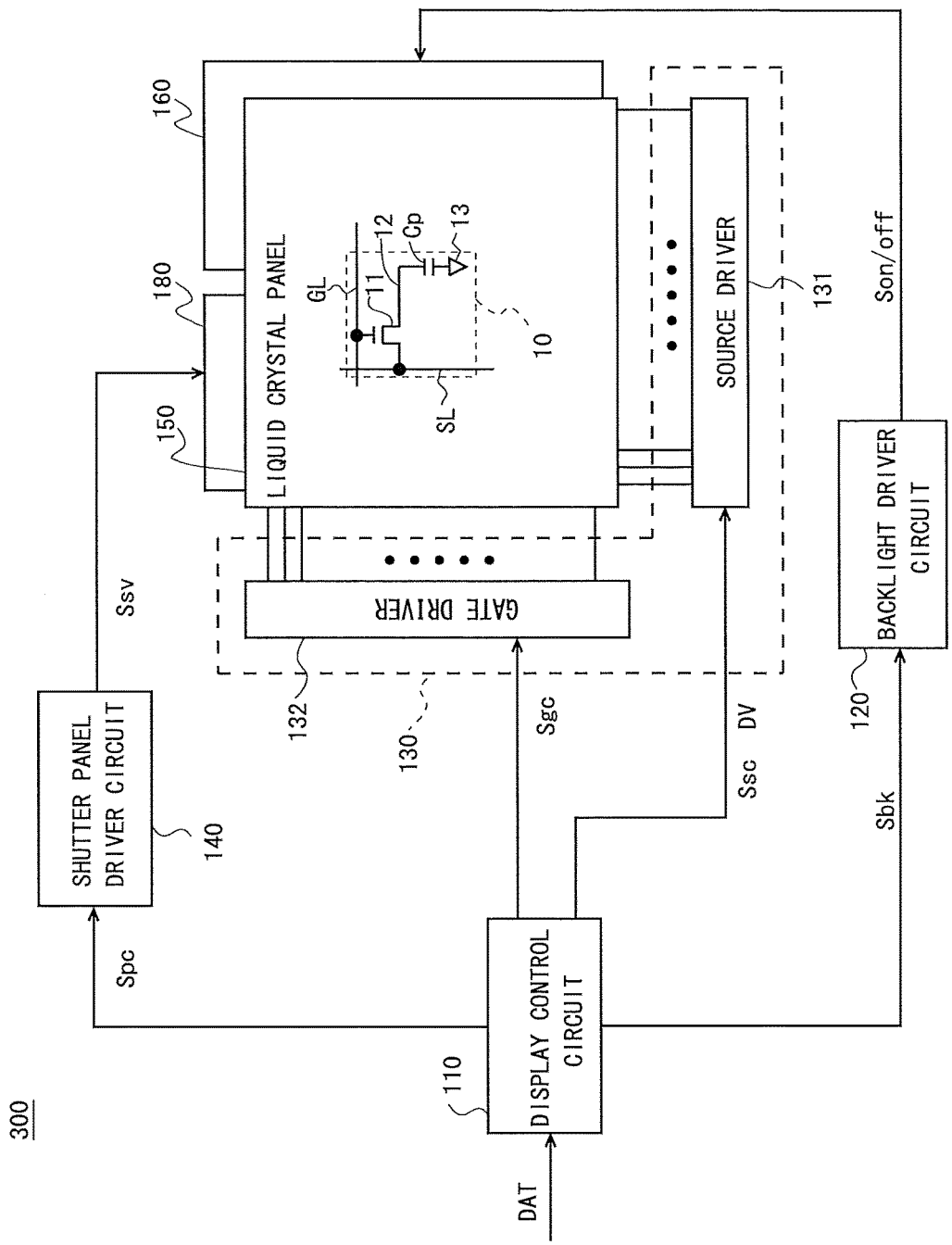
FIG. 8 is a block diagram illustrating the circuit configuration of a liquid crystal display device according to a third embodiment of the present invention.

FIG. 8 is a block diagram illustrating the circuit configuration of a liquid crystal display device 300 (also referred to as an "image display device") according to a third embodiment of the present invention. Elements of the liquid crystal display device 300 shown in FIG. 8 that are the same as those of the liquid crystal display device 100 shown in FIG. 2 are denoted by the same reference characters, and any descriptions thereof will be omitted, therefore, different elements will be mainly described.

<3.1 Circuit Configuration of the Liquid Crystal Display Device>

The liquid crystal display device 300 according to the present embodiment is provided with a shutter panel 180 (also referred to as a "shutter array" or "light control means") and a shutter panel driver circuit 140 (also referred to as an "light control means driver circuit"), in place of the transparent plate 170 of the liquid crystal display device 100 shown in FIG. 2. As with the transparent plate 170 of the liquid crystal display device 100 shown in FIG. 3, the shutter panel 180 not only reflects S-wave included in backlight emitted by the backlight source 160, toward the front side of the liquid crystal display device 300 but also transmits P-wave included in ambient light therethrough or blocks such P-wave.

Furthermore, the shutter panel driver circuit 140 is a circuit for driving the shutter panel 180, and the shutter panel driver circuit 140 generates open/close signals Ssv based on shutter control signals Spc externally provided along with image data DAT, and provides the open/close signals Ssv to the shutter panel 180. As a result, the shutter panel 180 functions as a shutter for opening/closing pixel forming portions (not shown) provided corresponding to the pixel forming portions 10 of the liquid crystal panel 150. The opening/closing of the pixel forming portion of the shutter panel 180 will be described in detail later.

<3.2 Configuration and Operation of the Liquid Crystal Display Device>

Figure 9:
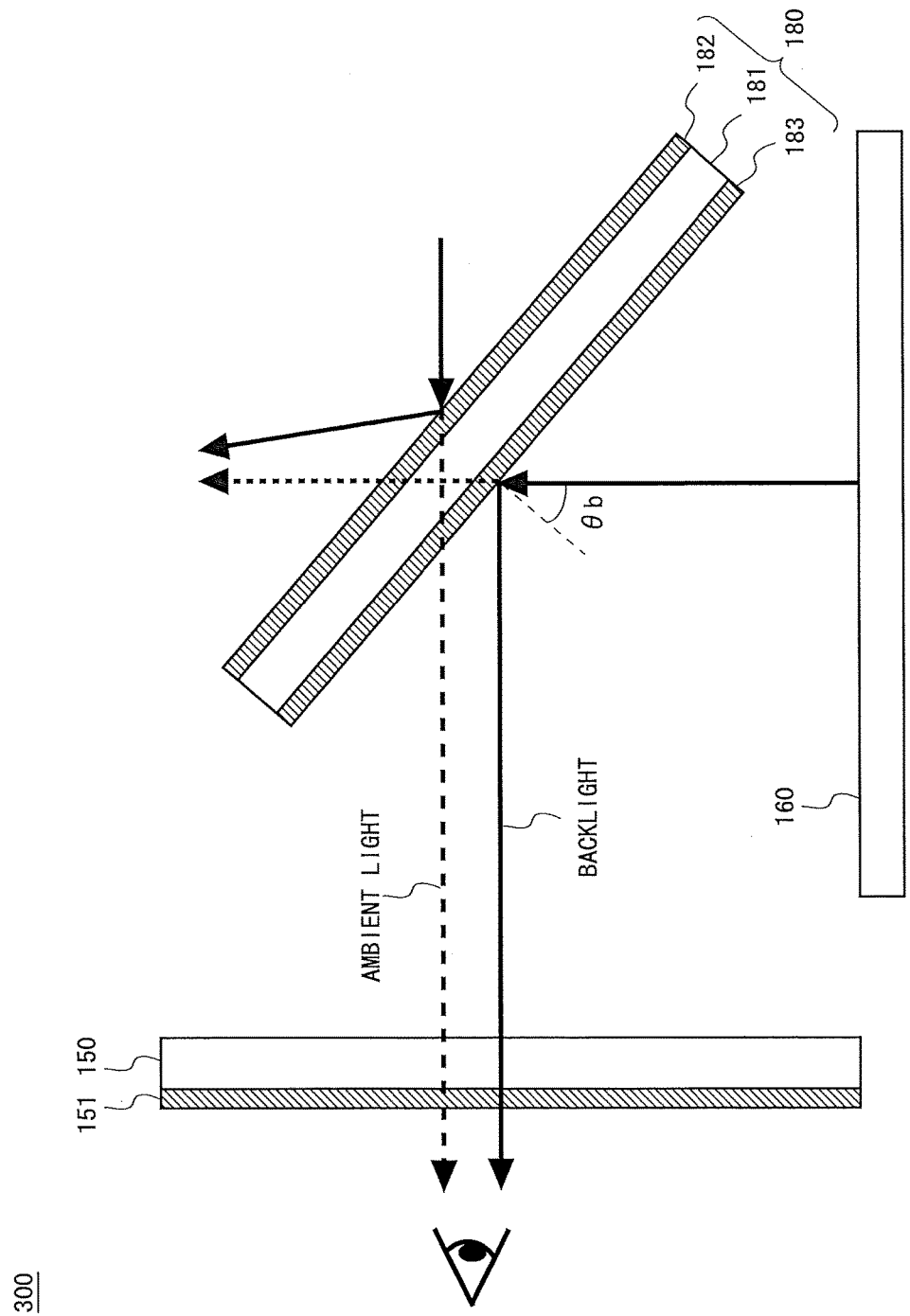
FIG. 9 is a diagram illustrating the configuration of the liquid crystal display device according to the third embodiment of the present invention.

FIG. 9 is a diagram illustrating the configuration of the liquid crystal display device 300 according to the present embodiment. The liquid crystal display device 300 shown in FIG. 9 is provided with the shutter panel 180, in place of the transparent plate 170 used in the liquid crystal display device 100 shown in FIG. 2. However, the other elements are the same as those of the liquid crystal display device 100, and therefore, are denoted by the same reference characters, and any descriptions thereof will be omitted, so the different element will be mainly described.

The shutter panel 180 includes a liquid crystal panel 181 (also referred to as a "third liquid crystal panel"), and the liquid crystal panel 181 has absorptive polarizing plates 182 and 183 (also referred to as "third polarizing plates") affixed to opposite sides. Both of the absorptive polarizing plates 182 and 183 are polarizing plates which transmit P-wave therethrough and absorb S-wave. Moreover, the liquid crystal panel 181 simply rotates the polarization direction of incident ambient light, and therefore, has no color films affixed thereto. Accordingly, the shutter panel 180 has high transmittance, and the shutter panel 180 can transmit more ambient light therethrough. Therefore, when the liquid crystal display device 300 functions as a see-through display, the background of the liquid crystal display device 300 is displayed with high luminance, so that the viewer can see the background more easily. Note that the liquid crystal display device 300 is not required to perform high-speed drive such as field-sequential drive, and therefore, as the liquid crystal panel 181 included in the shutter panel 180, a panel having about the same operation speed as typical liquid crystal panels can be used.

The operation of the liquid crystal display device 300 will now be described. Described first is the case where backlight is reflected by the shutter panel 180. When backlight emitted by the backlight source 160 is incident on the shutter panel 180, the backlight experiences Fresnel reflection at the surface of the absorptive polarizing plate 183 affixed to the shutter panel 180. The shutter panel 180 is attached such that the incidence angle of backlight is Brewster's angle θb. Accordingly, S-wave included in the backlight is partially reflected by the absorptive polarizing plate 183, thereby illuminating the liquid crystal panel 150, unreflected S-wave is transmitted through the shutter panel 180 toward the back side of the liquid crystal display device 300, and P-wave is absorbed by the absorptive polarizing plate 183. The S-wave incident on the liquid crystal panel 150 is emitted after being converted to S-wave, P-wave, or light containing S-wave and P-wave components, on the basis of data signals applied to the pixel forming portions 10. The S-wave or S-wave component is absorbed by the absorptive polarizing plate 151, so that only the P-wave or P-wave component reaches the front side of the liquid crystal display device 300. Thus, the viewer on the front side can see an image displayed on the liquid crystal panel 150.

Described next is the shutter function of the shutter panel 180. If ambient light is incident on the shutter panel 180 from the back side of the liquid crystal display device 300, S-wave included in the ambient light is absorbed by the absorptive polarizing plate 182, so that only P-wave is transmitted through the absorptive polarizing plate 182 and is incident on the liquid crystal panel 181. As a result, the intensity of the ambient light transmitted through the absorptive polarizing plate 182 becomes 50% of that at the time of incidence. Open/close signals Ssv provided by the shutter panel driver circuit 140 are applied to the pixel forming portions of the liquid crystal panel 181, which are provided at positions corresponding to the pixel forming portions 10 of the liquid crystal panel 150. In response to the open/close signals Ssv, the pixel forming portions of the liquid crystal panel 181 rotate the polarization direction of the incident P-wave. As a result, the liquid crystal panel 181 emits the P-wave without a change, or emits S-wave converted from the P-wave or light containing P-wave and S-wave components converted from the P-wave. The S-wave and S-wave component emitted by the liquid crystal panel 181 are absorbed by the absorptive polarizing plate 183, the P-wave or P-wave component is transmitted through the absorptive polarizing plate 183 as P-wave, thereby illuminating the liquid crystal panel 150. That is, the shutter panel 180 functions as a shutter which rotates the polarization direction of a polarized wave included in ambient light, so that the ambient light is transmitted therethrough as P-wave whose intensity is controlled to be an arbitrary value within the range of from 0% to 50% of the intensity at the time of incidence. Note that herein, P-wave included in ambient light and emitted by the liquid crystal panel 181 after the polarization direction is rotated in accordance with the open/close signals Ssv applied to the liquid crystal panel 181, S-wave converted from P-wave, and light converted from P-wave and including P-wave and S-wave components will also be collectively referred to as "fourth polarized waves".

Next, the P-wave of the ambient light emitted by the shutter panel 180 is incident on the liquid crystal panel 150. In the case where P-wave derived from ambient light is transmitted through the pixel forming portions 10 of the liquid crystal panel 150 without the polarization direction thereof being rotated, the P-wave is further transmitted through the absorptive polarizing plate 151 to the front side of the liquid crystal display device 300. As a result, the pixel forming portions 10 are rendered transparent, so that the viewer can see the background of the liquid crystal display device 300.

Furthermore, in the case where P-wave derived from ambient light is converted to S-wave and emitted by the pixel forming portions 10 of the liquid crystal panel 150, the emitted S-wave is absorbed by the absorptive polarizing plate 151, and therefore, no ambient light reaches the front side of the liquid crystal display device 300. Accordingly, the pixel forming portions 10 are not rendered transparent, so that the viewer cannot see the background of the liquid crystal display device 300 at all.

Furthermore, in the case where P-wave derived from ambient light is emitted by the pixel forming portions 10 of the liquid crystal panel 150 after being converted to light containing P-wave and S-wave components, the S-wave component is absorbed by the absorptive polarizing plate 151, so that only the P-wave component is transmitted through the absorptive polarizing plate 151 to the front side of the liquid crystal display device 300. Accordingly, the pixel forming portions 10 are rendered transparent, so that the viewer can see the background of the liquid crystal display device 300. However, since the P-wave derived from the ambient light incident on the liquid crystal panel 150 is partially converted to the S-wave component, the amount of P-wave reaching the front side of the liquid crystal display device 300 is low. Consequently, the luminance of the background that can be seen is also low.

Described next are an image displayed on the liquid crystal panel 150 of the liquid crystal display device 300 and a background that is seen through where the shutter panel 180 is completely open/closed and the backlight source 160 is turned on/off. Note that in the following, the wording "the shutter panel 180 is completely open" is intended to mean that the pixel forming portions of the liquid crystal panel 181 emit incident P-wave without rotating the polarization direction of the P-wave, whereas the wording "the shutter panel 180 is completely closed" is intended to mean that the pixel forming portions of the liquid crystal panel 181 converts P-wave to S-wave by rotating the polarization direction of the P-wave but emit neither P-wave nor S-wave.

First, the case where the backlight source 160 is on and the shutter panel 180 is completely closed will be described. Only S-wave derived from backlight is incident on the liquid crystal panel 150 from the back side, so that the liquid crystal panel 150 displays only an image in accordance with image data DAT, and the background of the liquid crystal display device 300 is not displayed at all. In this manner, unlike the liquid crystal display device 100, the liquid crystal display device 300 can completely block ambient light. Therefore, for example, in the case where an image of a person is displayed, the pixel forming portions 10 that should display black hair can be displayed in black, leading to a significantly increased degree of freedom in representation. Such a state is referred to as "on-state".

Next, the case where the backlight source 160 is off and the shutter panel 180 is completely open will be described. In this case, only P-wave derived from ambient light is incident on the liquid crystal panel 150 from the back side, and therefore, the liquid crystal panel 150 functions as a transparent see-through display. Accordingly, the liquid crystal panel 150 displays only the background of the liquid crystal display device 300, and no image in accordance with image data DAT is displayed at all. Such a state is referred to as "transparent state".

Furthermore, the case where the backlight source 160 is off and the shutter panel 180 is completely closed will be described. In this case, neither S-wave derived from backlight nor P-wave derived from ambient light is incident on the liquid crystal panel 150, and therefore, the liquid crystal panel 150 displays neither an image nor the background. Such a state is referred to as "off-state".

In this manner, the liquid crystal panel 150 of the liquid crystal display device 300 is a display capable of providing display in the three states, i.e., on-state, transparent state, and off-state, and the state of display can be controlled freely for each pixel forming portion 10. Note that in the case where the backlight source 160 is on and the shutter panel 180 is completely open, the liquid crystal panel 150 displays an image along with the background. Accordingly, the viewer on the front side of the liquid crystal display device 300 can see both the image and the background. This state corresponds to simultaneous display in two states, i.e., on-state and transparent state.

The cases where the shutter panel 180 is completely open or closed have been described above, but the shutter panel 180 may be partially open. More specifically, this is realized by the liquid crystal panel 181 rotating the polarization direction of P-wave incident on the shutter panel 180 and converting the P-wave to light containing P-wave and S-wave components. The transmittance of the shutter panel 180 is determined by the ratio of the resultant P-wave and S-wave components, and the transmittance increases as the ratio of the P-wave component becomes higher. In this case also, the liquid crystal display device 300 functions as a see-through display having transparency corresponding to the transmittance of the shutter panel 180, and displays an image on the background. Such a state corresponds to a combination of the three states, on-state, transparent state, and off-state.

Furthermore, in the case where the absorptive polarizing plate 151 is a polarizing plate which absorbs S-wave and transmits P-wave therethrough, even when the liquid crystal display device 300, including the backlight source 160, is powered off, the viewer can see the background of the liquid crystal display device 300 through the liquid crystal panel 150, as in the case of the liquid crystal display device 100.

Furthermore, the liquid crystal display device 300 may control all pixel forming portions 10 of the liquid crystal panel 150 to take the same one of the following states: on-state, transparent state, off-state, and a combined state of the three, or their respective states independently of one another.

<3.3 Effects>

The present embodiment renders it possible to achieve effects similar to those described in the first embodiment. Furthermore, the present embodiment renders it possible to provide display in any of the three states, i.e., on-state, transparent state, and off-state, or in a combined state of the three. That is, unlike in the first and second embodiments, the liquid crystal display device 300 can provide display not only in on-state and transparent state but also in off-state. This allows representation in black, resulting in a significantly increased degree of freedom in display.

<3.4 Variants>

<3.4.1 First Variant>

In place of the absorptive polarizing plates 182 and 183, reflective polarizing plates which transmit P-wave therethrough and absorb S-wave may be affixed to opposite sides of the liquid crystal panel 181. In such a case, since the reflective polarizing plates reflect S-wave included in ambient light, the back side of the liquid crystal display device 300 becomes a mirror surface reflecting the background. Moreover, in place of the absorptive polarizing plate 182, a reflective polarizing plate which transmits P-wave therethrough and absorbs S-wave may be affixed to the liquid crystal panel 181.

<3.4.2 Second Variant>

Furthermore, in place of the shutter panel 180 with the absorptive polarizing plates 182 and 183 affixed to opposite sides of the liquid crystal panel 181, a shutter panel with mechanical shutters provided thereon may be provided. The shutter panel has an absorptive polarizing plate affixed to the front-side surface of the transparent plate 170, and the absorptive polarizing plate transmits P-wave therethrough and absorbs S-wave. Moreover, on the back-side surface of the transparent plate 170, there is provided a plurality of mechanical shutters whose open/closed states can be controlled, corresponding to the pixel forming portions 10 of the liquid crystal panel 150. One example of such a mechanical shutter is an MEMS (micro-electro-mechanical systems) element. When the mechanical shutter is open, both P-wave and S-wave pass through the mechanical shutter, whereas when the mechanical shutter is closed, neither P-wave nor S-wave passes. S-wave passing through the shutter panel is absorbed by the absorptive polarizing plate, so that only P-wave is incident on the liquid crystal panel 150 after being transmitted through the shutter panel. In this manner, the shutter panel with the mechanical shutters provided thereon has the same function as the shutter panel 180. Note that to increase P-wave transmittance, it is preferable to provide mechanical shutters having a high aperture ratio. Moreover, since the transparent plate 170 is attached such that the incidence angle of ambient light is Brewster's angle $\theta b$, the ambient light that is transmitted through the transparent plate 170 is primarily P-wave, regardless whether the absorptive polarizing plate is affixed. Therefore, the absorptive polarizing plate does not have to be affixed to the transparent plate 170.

4. Fourth Embodiment

The circuit configuration of a liquid crystal display device 400 (also referred to as an "image display device") according to a fourth embodiment of the present invention is the same as that of the liquid crystal display device 300 shown in FIG. 8, and therefore, any description and block diagram thereof will be omitted.

Figure 10:
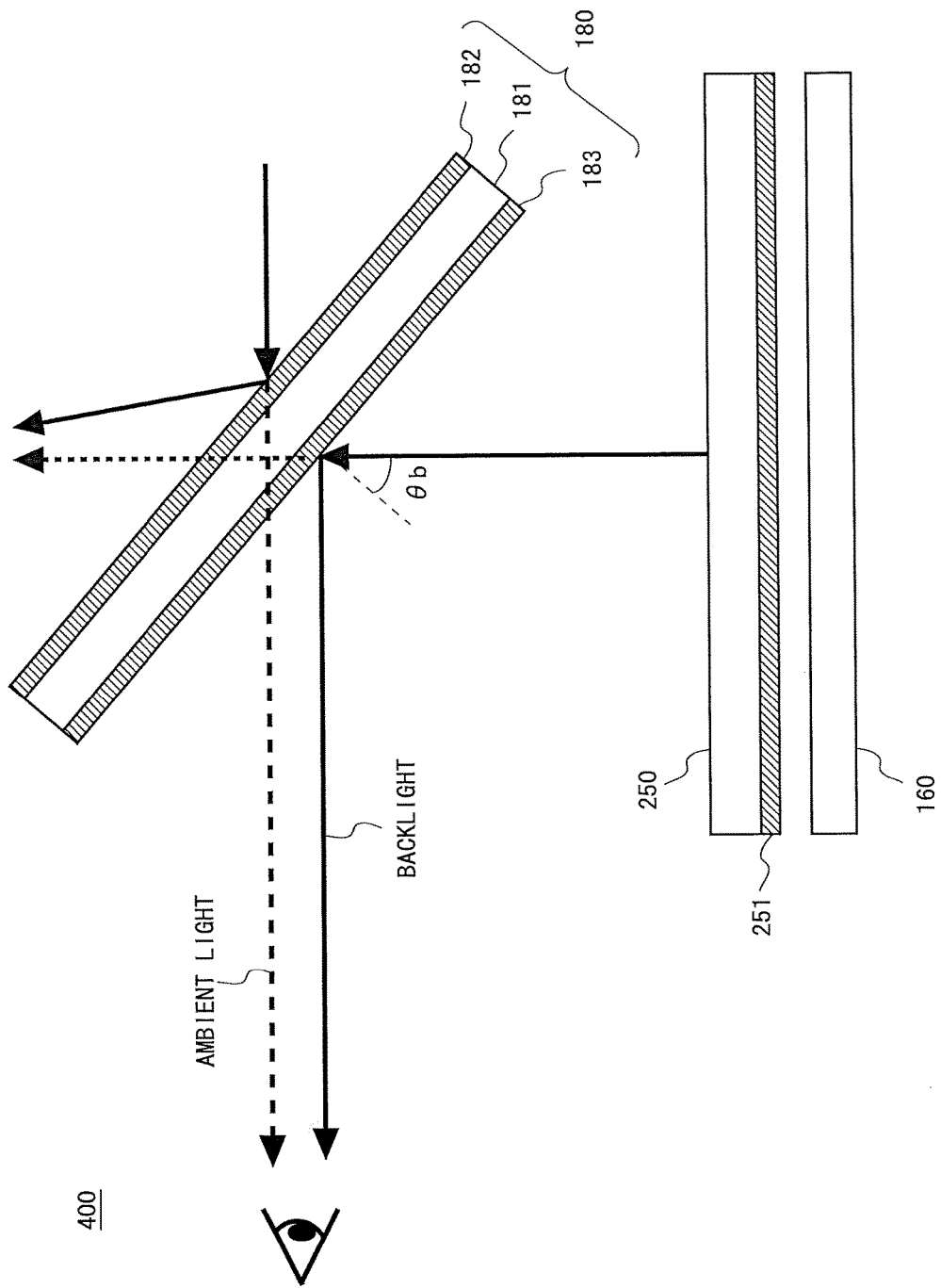
FIG. 10 is a diagram illustrating the configuration of a liquid crystal display device according to a fourth embodiment of the present invention.

FIG. 10 is a diagram illustrating the configuration of the liquid crystal display device 400 according to the present embodiment. As shown in FIG. 10, the liquid crystal display device 400 of the present embodiment differs from the liquid crystal display device 200 shown in FIG. 5 in that the shutter panel 180 is provided in place of the transparent plate 170. The configuration and the function of the shutter panel 180 are the same as those described in the third embodiment. Accordingly, any detailed descriptions of the configuration and the operation of the liquid crystal display device 400 will be omitted.

<4.1 Effects>

The present embodiment renders it possible to achieve effects similar to those described in the second embodiment. Moreover, in the present embodiment, unlike in the second embodiment, the liquid crystal display device 400 can provide display not only in on-state and transparent state but also in off-state. Thus, as has been described in conjunction with the third embodiment, the degree of freedom in display can be significantly increased.

Furthermore, as in the second embodiment, the liquid crystal display device 400 functions as a see-through display with extremely high transparency even in the case of drive in color-filter mode using a typical liquid crystal panel as the liquid crystal panel 250. In this case, as in the third embodiment, a panel having about the same operation speed as typical liquid crystal panels can be used as the liquid crystal panel 181 included in the shutter panel 180.

<4.2 Variants>

<4.2.1 First Variant>

In place of the absorptive polarizing plates 182 and 183, reflective polarizing plates which transmit P-wave therethrough and absorb S-wave may be affixed to opposite sides of the liquid crystal panel 181. In such a case, the reflective polarizing plates reflect S-wave included in ambient light, and therefore, the back surface of the liquid crystal display device 400 becomes a mirror surface reflecting the background. Alternatively, one of the absorptive polarizing plates 182 and 183 may be replaced by a reflective polarizing plate which transmits P-wave therethrough and reflects S-wave.

<4.2.2 Second Variant>

Figure 11:
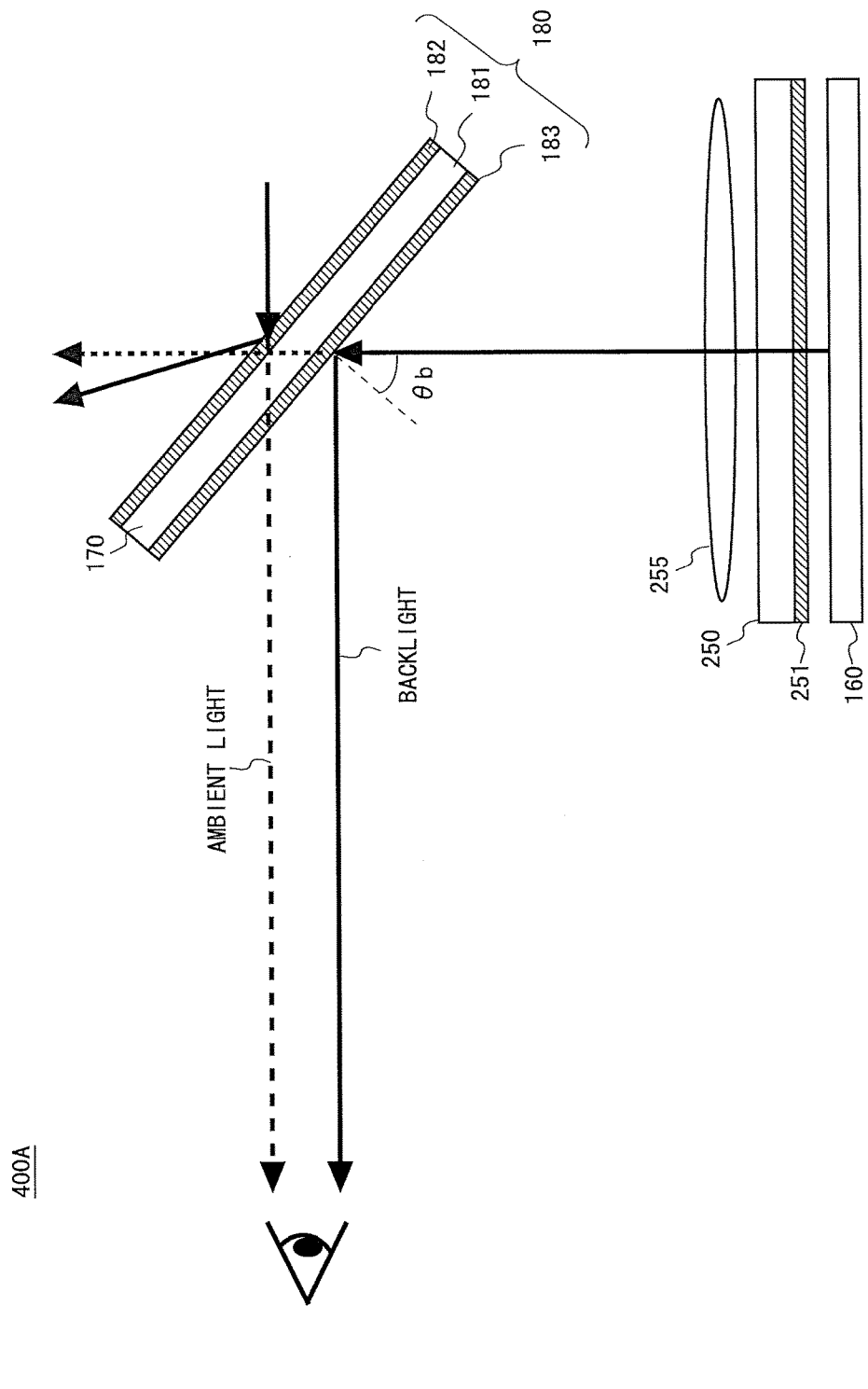
FIG. 11 is a diagram illustrating the configuration of an image display device according to a second variant of the fourth embodiment of the present invention, which functions as a projector.
Figure 12:
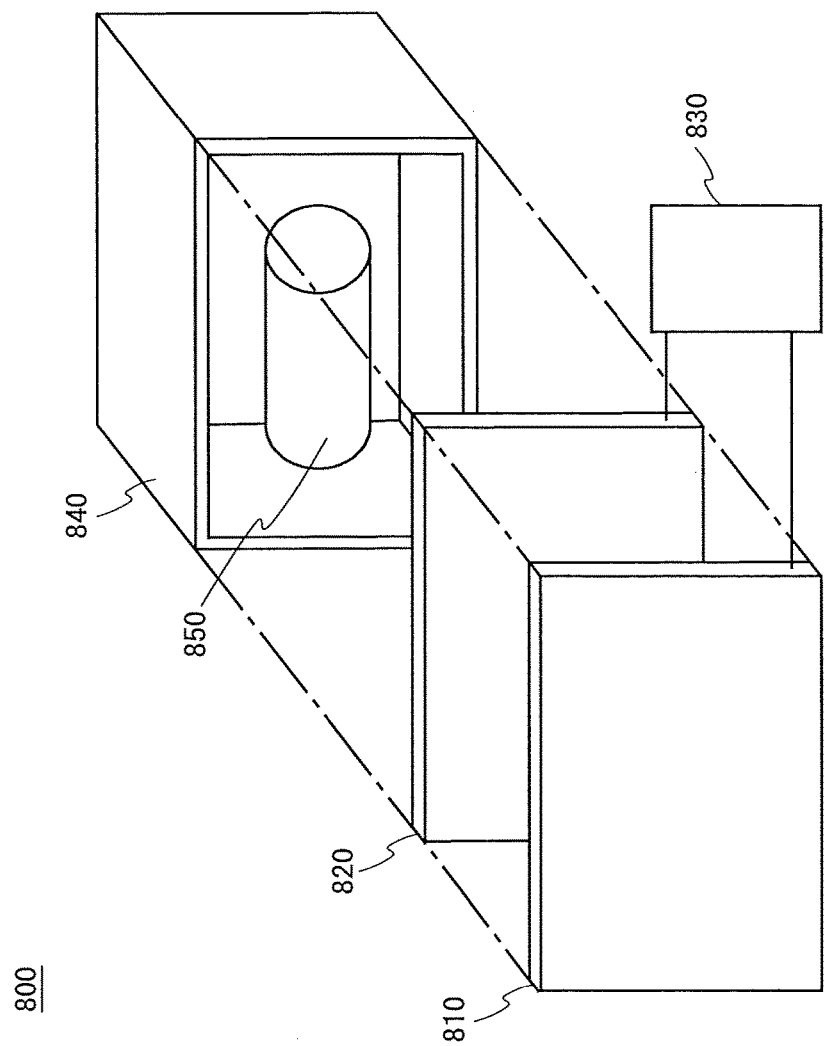
FIG. 12 is a diagram illustrating the configuration of a conventional liquid crystal display device provided with a see-through display function.

FIG. 11 is a diagram illustrating the configuration of a liquid crystal display device 400A (also referred to as an "image display device") according to a second variant of the present embodiment, which functions as a projector. As shown in FIG. 11, in the liquid crystal display device 400A, the backlight source 160 is provided on one side of the liquid crystal panel 250, and the lens group 255, which includes a combination of lenses, is provided on the other side. The liquid crystal display device 400A projects an image onto the transparent plate 170 by means of the lens group 255. The viewer looks at the transparent plate 170, thereby seeing the projected image or the background of the liquid crystal display device 400A. Note that in FIG. 11, for the sake of convenience, the lens group 255 is shown as a convex lens. Moreover, as with the liquid crystal display device 200, the liquid crystal display device 400A allows local dimming.

<4.2.3 Third Variant>

Furthermore, in place of the shutter panel 180 with the absorptive polarizing plates 182 and 183 affixed to opposite sides of the liquid crystal panel 181, a shutter panel having the same structure as the shutter panel with the mechanical shutters provided thereon as described in the second variant of the third embodiment may be provided. In such a case, effects similar to those achieved by the second variant of the third embodiment can be achieved. Note that the transparent plate is attached such that the incidence angle of ambient light is Brewster's angle θb, and therefore, neither an absorptive polarizing plate nor a reflective polarizing plate has to be affixed to the transparent plate.

5. Other Variants

Any display which can be used as a polarization control pixel array of the present invention requires a backlight source and needs to be capable of becoming transparent. In the above embodiments, such displays have been described taking the liquid crystal panels 150 and 250 as examples. However, the displays that can be used in the present invention are not limited to the liquid crystal panels 150 and 250, and may be a display using, for example, a half-wave plate or suchlike which rotates linearly polarized light utilizing the following: a magneto-optic effect in which polarization of light transmitted through a substance or reflected by the surface of a substance is affected by magnetic properties of the substance; an electro-optic effect in which optical rotation changes by light acting on a substance being affected by an electric field; or double refraction.

INDUSTRIAL APPLICABILITY

The present invention can be applied to image display devices capable of providing transparent display which allows the background of the display to be seen through from the front side.

DESCRIPTION OF THE REFERENCE CHARACTERS

100 to 400 liquid crystal display device (image display device)
110 display control circuit
120 backlight drive circuit (luminescent light source driver circuit)
130 driver circuit
140 shutter panel driver circuit
150 liquid crystal panel (first liquid crystal panel or polarization control pixel array)
151 absorptive polarizing plate (first polarizing plate)
160 backlight source (display luminescent light source)
170 transparent plate (light control means)
175 container filled with liquid (light control means)
180 shutter panel (light control means)
181 liquid crystal panel (third liquid crystal panel)
182, 183 absorptive polarizing plate (third polarizing plate)
250 liquid crystal panel (second liquid crystal panel or polarization control pixel array)
251 absorptive polarizing plate (second polarizing plate)
255 lens group
DAT image data (image information)
θb Brewster's angle

The invention claimed is:
1. An image display device having a see-through display function, comprising:
   a polarization control pixel array that controls a polarization direction of light on the basis of externally provided image information;
   a display luminescent backlight that irradiates the polarization control pixel array with source light; and a shutter panel that allows a P-wave or a P-wave component derived from ambient light to be transmitted and reflects an S-wave or an S-wave component derived from source light, thereby emitting at least one of the P-wave, the P-wave component, the S-wave, or the S-wave component toward a front side of the image display device, or to block a part or all of the ambient light from being transmitted, the P-wave and the P-wave component being generated from ambient light incident from a back side of the image display device by controlling the polarization direction of the ambient light, the S-wave and S-wave component being derived from source light emitted by the display luminescent backlight when the display luminescent backlight is on, wherein, the shutter panel is attached such that the source light is incident at an angle approximately equal to Brewster's angle; and the polarization control pixel array controls the polarization direction of light of at least the source light, and emits a polarized wave including at least one of the S-wave, the P-wave, the S-wave component, and the P-wave component.

2. The image display device according to claim 1, wherein, the polarization control pixel array is disposed so as to be irradiated from the back side with the P-wave or P-wave component derived from the ambient light and transmitted through the shutter panel and the S-wave included in the source light and reflected by the shutter panel, the shutter panel allows the P-wave or P-wave component derived from the ambient light to be transmitted and reflects the S-wave included in the source light when the display luminescent backlight is on, thereby irradiating the polarization control pixel array from the back side with at least one of the P-wave or P-wave component derived from the ambient light, and the S-wave included in the source light, or the shutter panel blocks a part or all of the ambient light from being transmitted, and the polarization control pixel array allows a first optional polarized wave, a second optional polarized wave, or both, to be transmitted, the first optional polarized wave being selected from first polarized waves generated on the basis of the P-wave or P-wave component derived from the ambient light and transmitted through the shutter panel, the second optional polarized wave having the same polarization direction as the first optional polarized wave and being selected from second polarized waves generated on the basis of the S-wave included in the source light and reflected by the shutter panel.

3. The image display device according to claim 2, wherein, the polarization control pixel array includes a first liquid crystal panel and a first polarizing plate affixed to a front-side surface of the first liquid crystal panel, the first liquid crystal panel includes a plurality of pixel forming portions and generates the first polarized waves and the second polarized waves for each of the pixel forming portions by controlling rotation of the polarization direction for each of the P-wave or P-wave component derived from the ambient light and the S-wave included in the source light on the basis of the image information, and for each of the pixel forming portions, the first polarizing plate allows the first optional polarized wave selected from the first polarized waves generated by the first liquid crystal panel, the second optional polarized wave selected from the second polarized waves, or both, to be transmitted through to the front side of the image display device.

4. The image display device according to claim 1, wherein, the polarization control pixel array is disposed close to the display luminescent backlight and emits third polarized waves toward the shutter panel, the third polarized waves being generated by controlling the polarization direction of the source light emitted by the display luminescent backlight, and the shutter panel allows the P-wave or P-wave component derived from the ambient light to be transmitted and reflects an S-wave or S-wave component selected from the third polarized waves derived from the source light when the display luminescent backlight is on, thereby allowing the P-wave or P-wave component derived from the ambient light, the S-wave or S-wave component derived from the source light, or both, to reach the front side of the image display device, or the shutter panel blocks a part or all of the ambient light from being transmitted.

5. The image display device according to claim 4, wherein, the polarization control pixel array includes a second liquid crystal panel and a second polarizing plate affixed to a surface of the second liquid crystal panel facing the display luminescent backlight, the second polarizing plate transmits a polarized wave therethrough toward the second liquid crystal panel, the polarized wave being either P-wave or S-wave included in the source light emitted by the display luminescent backlight, and the second liquid crystal panel includes a plurality of pixel forming portions, generates the third polarized waves for each of the pixel forming portions by controlling rotation of the polarization direction of the polarized wave on the basis of the image information, and emits the generated waves toward the shutter panel.

6. The image display device according to claim 4, wherein a lens group consisting of a plurality of lenses is provided on the opposite side to the display luminescent backlight with the polarization control pixel array positioned therebetween.

7. The image display device according to claim 1, wherein the shutter panel includes a third liquid crystal panel and two third polarizing plates affixed to opposite sides of the third liquid crystal panel and transmitting P-wave therethrough, and the third liquid crystal panel generates fourth polarized waves by controlling rotation of the polarization direction of the ambient light incident from the back side of the image display device and allows P-wave or a P-wave component included in the fourth polarized waves to be selectively transmitted therethrough, or the third liquid crystal panel blocks a part or all of the ambient light from being transmitted.

8. The image display device according to claim 1, wherein the shutter panel includes a transparent plate and a plurality of mechanical shutters capable of opening and closing and provided on a surface of the transparent plate, the mechanical shutters being opened/closed to allow the P-wave included in the ambient light to be transmitted or block a part or all of the ambient light from being transmitted.

9. The image display device according to claim 1, further comprising a luminescent backlight driver circuit that controls power to be supplied to the display luminescent backlight.

* * * * *